United States Patent [19]

Dennis et al.

[11] 3,962,706

[45] June 8, 1976

[54] DATA PROCESSING APPARATUS FOR HIGHLY PARALLEL EXECUTION OF STORED PROGRAMS

[75] Inventors: Jack B. Dennis, Belmont; David P. Misunas, Boston, both of Mass.

[73] Assignee: Massachusetts Institute of Technology, Cambridge, Mass.

[22] Filed: Mar. 29, 1974

[21] Appl. No.: 456,488

[52] U.S. Cl. .......... 340/172.5

[51] Int. Cl.[2] .......... G06F 3/00; G06F 13/00; G06K 17/00

[58] Field of Search .......... 340/172.5; 445/1

[56] References Cited

UNITED STATES PATENTS

| | | | |
|---|---|---|---|
| 3,349,375 | 10/1967 | Seeber et al. | 340/172.5 |
| 3,537,074 | 10/1970 | Stokes et al. | 340/172.5 |
| 3,676,852 | 7/1972 | Abernathy et al. | 340/172.5 |
| 3,718,912 | 2/1973 | Hasbrouck et al. | 340/172.5 |
| 3,766,532 | 10/1973 | Liebel | 340/172.5 |

OTHER PUBLICATIONS

Tomasulo, R. M., "An Efficient Algorithm for Exploiting Multiple Arithmetic Units," IBM Journal, Jan. 1967, pp. 25–33.

Anderson, D. W., et al., "IBM System 1360 Model 91: Machine Philosophy and Instruction Handling," IBM Journal, Jan. 1967, pp. 9–24.

Shapiro, R. M., et al., "Representation of Algorithms as Cyclic Partial Orderings," Applied Data Research, Inc., Dec. 27, 1971.

Miller, R. E., et al., "Configurable Computers: A New Class of General Purpose Machines," Symposium on Theoretical Programming, Novosibirsk, U.S.S.R. Aug. 7–11, 1972.

*Primary Examiner*—Raulfe B. Zache
*Assistant Examiner*—Jan E. Rhoads
*Attorney, Agent, or Firm*—Arthur A. Smith, Jr.; Martin M. Santa; Gerald Altman

[57] ABSTRACT

This invention is a new concept for the organization of digital data processing apparatus, suitable for highly parallel execution of certain computations involving repeated patterns of computational operations. Possible applications include many types of signal processing computations such as filtering, modulation and waveform generation. The invention permits exploitation of the unique properties of asynchronous digital logic.

16 Claims, 54 Drawing Figures

FIG. 12
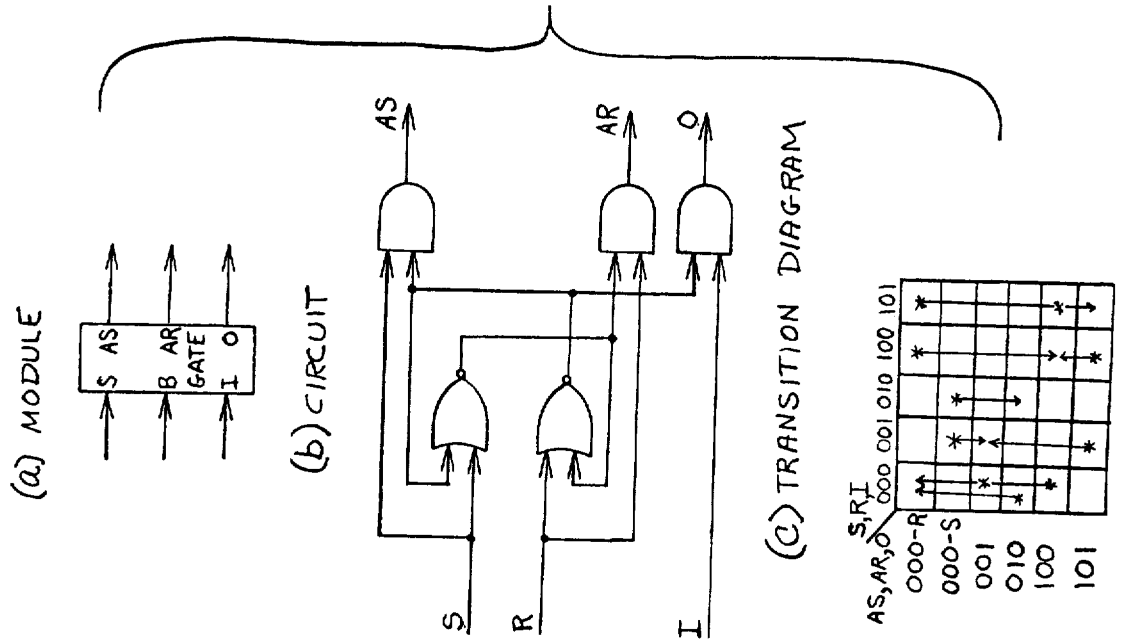
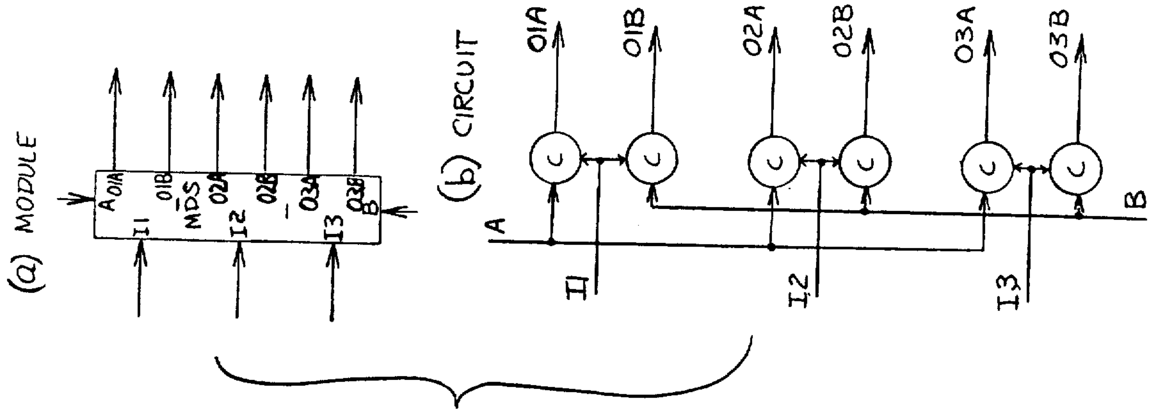
FIG. 11

DATA PROCESSING APPARATUS FOR HIGHLY PARALLEL EXECUTION OF STORED PROGRAMS

The work resulting in this invention was supported by research grants from the Office of Computing Activities of the National Science Foundation.

BACKGROUND OF THE INVENTION

The invention relates to a data processing system which executes stored programs in highly parallel fashion. In the prior art, highly parallel execution of stored programs is realized by complex techniques which either divide the program into parts which may be independently executed by separate parts of a data processing system, or the data processing system is arranged to look ahead of the current instruction in a sequential program to determine what other instructions may be performed concurrently with the current instruction. It is an object of this invention to provide a method for realizing highly parallel execution of stored programs by data processing apparatus that identifies instructions available for concurrent execution throughout the program.

SUMMARY OF THE INVENTION

A digital data processor capable of executing stored programs in a highly parallel manner is described. The instructions of the program and the data items to be processed are held in the Registers of a Memory, each Register having a unique address. The Registers are grouped into Cells, each Cell having a Register holding an instruction and two Registers holding operands for the operation specified by the instruction. Each instruction consists of an operation part and two addresses that specify the Registers that are to receive the result of the specified operation. When all three Registers of a Cell are full, their contents are formed into an instruction packet which is sent to the appropriate Functional Unit through an Arbitration Network. The Functional Units perform computational operations specified by instructions and form result packets each consisting of the result of an operation and an address from the instruction. Each result packet is transmitted to the Register specified by its address part through a Distribution Network. The Controller interprets commands for setting up programs and data in the Memory, and controlling the execution of programs.

DESCRIPTION OF FIGURES

FIG. 11 is a schematic diagram for the multiple data switch module;

FIG. 12 is a schematic diagram for the gate module;

PART I. DESCRIPTION OF THE INVENTION

1. Introduction

The invention described herein is a means of achieving highly concurrent execution of certain digital computations through use of a new arrangement of memory and processing apparatus and a new form of stored representation for the algorithms to be performed.

Figure 1:
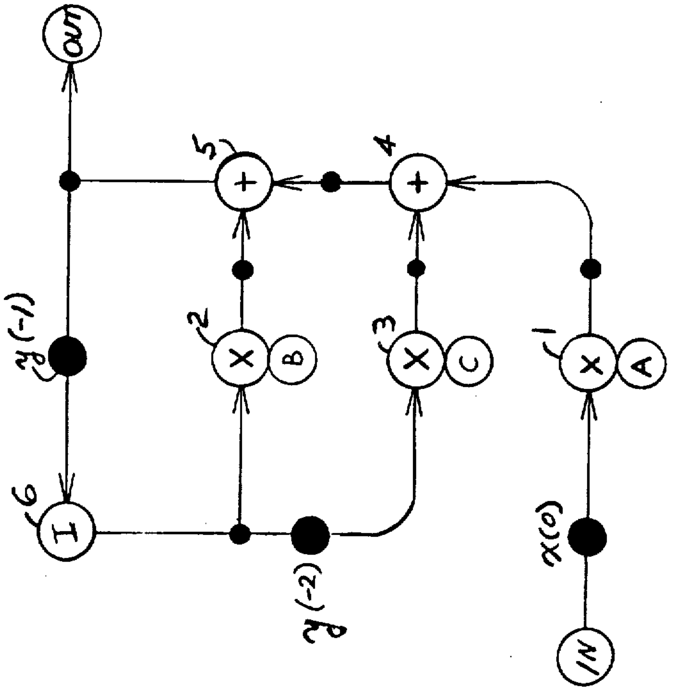
FIG. 1 is an example of a data flow schema.

It is convenient to discuss computations suited to execution using the invention, in the embodiment to be described, in terms of a so-called data flow representation for computational processes. FIG. 1 is a data flow schema that represents the computation required for a second order recursive digital filter:

$$y(t) = Ax(t) + By(t-1) + Cy(t-2)$$

where $x(t)$ and $y(t)$ denote input and output samples for time $t$. In this schema operators 1, 2 and 3 are unary operators that multiply by the fixed parameters A, B and C. Operators 4 and 5 are binary operators that perform addition, and operator 6 is an identity operator that transmits its input values unchanged. Each small dot represents a link that passes values computed by one operator to its successor operators.

The large solid dots show the presence of values on certain arcs of the schema and define its initial configuration. An operator with values present on each of its input arcs is ready to act, and does so by removing values from its input arcs, computing a result, and placing the result on its output arc.

A link with a value present on its input arc acts by removing the value from its input arc and placing a copy of the value on each of its output arcs. An operator or link may not act until any values present on its output arc or arcs have been removed.

The invention comprises three ideas:

1. A machine level representation for data flow schemas that is suited to direct interpretation by processing equipment.
2. A concept for an active Memory that holds instructions and operands, identifies those instructions ready for execution, and receives new operand values.
3. A concept for using an Arbitration Network for transferring instructions and operands from the Memory to Functional Units, and using a Distribution Network for transferring results from Functional Units to the Memory.

In the following we describe the organization and principles of operation of a processor which embodies the concepts of the invention. It is easiest to describe the processor in terms of asynchronous operation of its parts. In doing this, we do not wish to limit our claims to asynchronous embodiments of the invention.

2. General Description of the Processor

Figure 2:
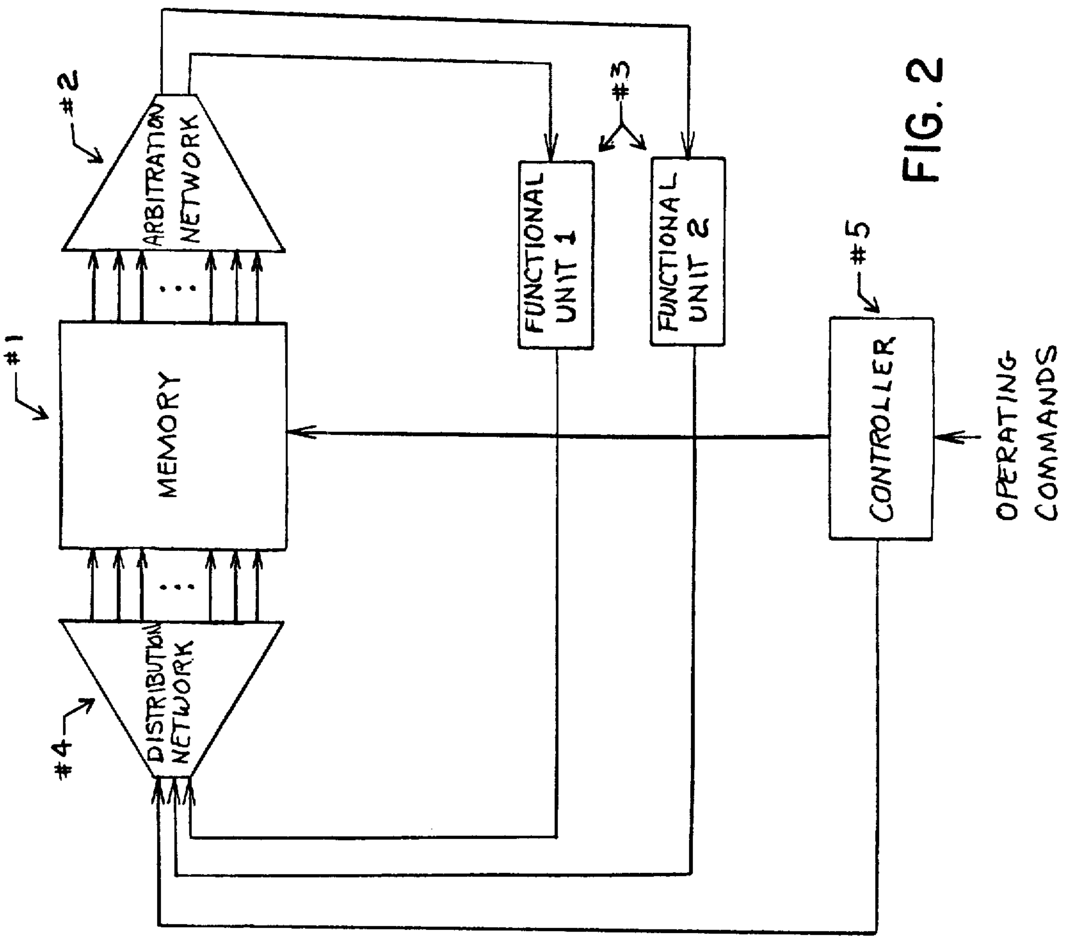
FIG. 2 is a block diagram of the general organization of the processor.

The general organization of the proposed processor is shown in FIG. 2.

There are five major sections:

Memory (2 # 1)*
Arbitration Network (2 # 2)
Functional Units (2 # 3)
Distribution Network (2 # 4)
Controller (2 # 5)

*The notation (2 # 1) means the item designated # 1 in FIG. 2.

Each connection between sections of the machine is independently coordinated by use of an acknowledge signal for each packet of information sent over the connection. A detailed description of each section is given in later paragraphs.

The information units transmitted through the Arbitration Network from the Memory to the Functional Units are called instruction packets; each instruction packet specifies one unit of work for the Functional Unit to which it is directed. The information units sent through the Distribution network from Functional Units to the Memory are called result packets; each result packet delivers a newly computed value to a specific value-holding Register Unit in the Memory.

Figure 3:
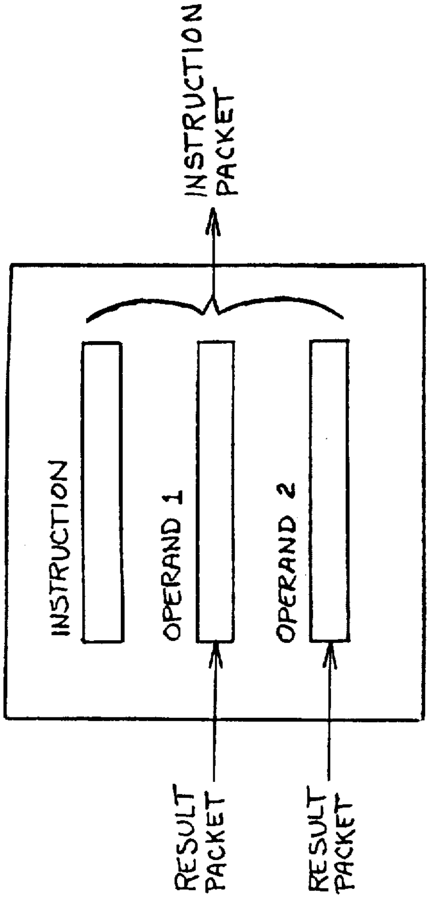
FIG. 3 is an example of the structure of a Memory Cell.

The Memory holds a representation of the data flow schema that defines the computation to be performed, and holds computed values awaiting use. The Memory is a collection of Cells; each operator of the schema together with its output link is associated with some Cell of the Memory. Each Cell (FIG. 3) contains three Register Units — one Register to hold an instruction which encodes the type of operator and its connections to other operators of the schema, and two Registers that receive operand values for use in the next execution of the instruction. When the processor is first turned on, each Register is empty. Registers are set to treat their contents as a constant or variable when they are given initial values by the Controller through the Distribution Network. In each Cell, the Register that holds an instruction is always set in constant mode. Operand registers are set in constant or variable mode according to the requirements of the schema being executed. When the instruction Register of a Cell is filled, and both operand Registers contain values, the Cell is said to be enabled and the contents of the three Registers (instruction and two operand values) form an instruction packet which is presented to the Arbitration Network. When the packet is transmitted into the Arbitration Network, each Register in constant mode retains its instruction or value, and each Register in variable mode becomes empty.

Figure 4:
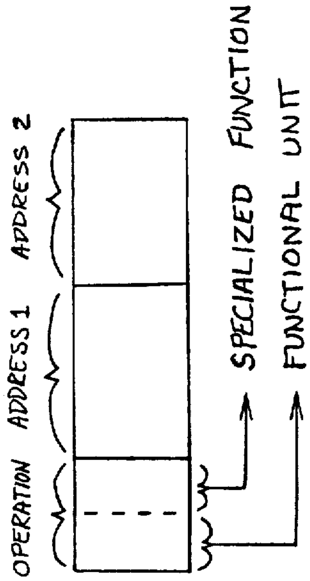
FIG. 4 is an example of the format of an instruction.
Figure 5:
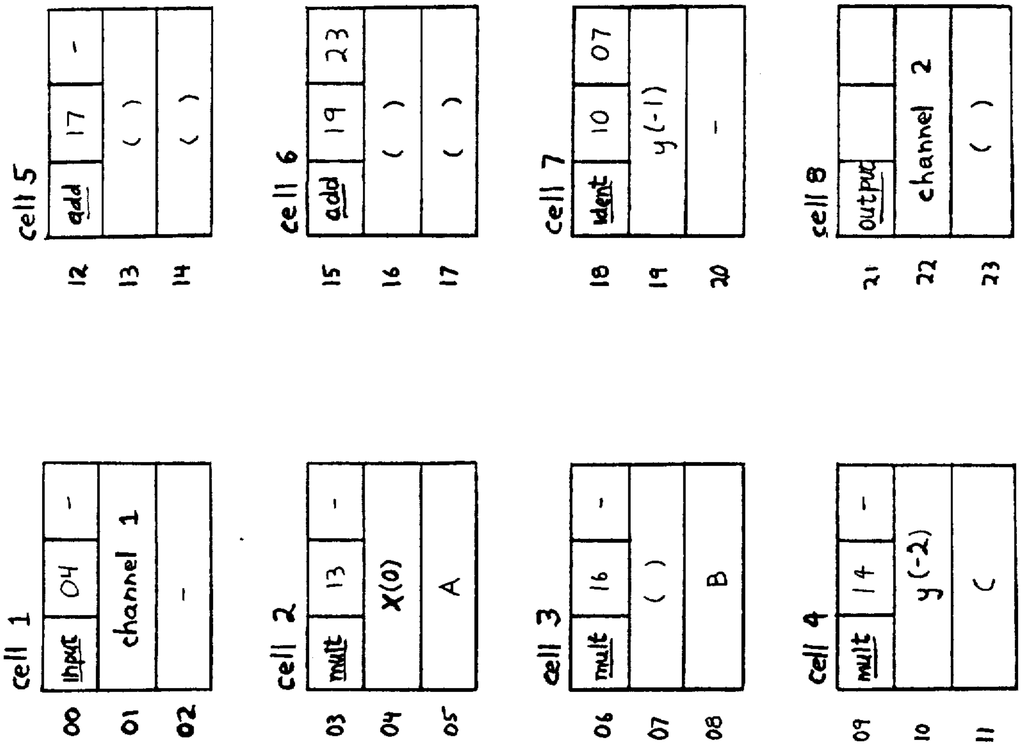
FIG. 5 is an example of the state of the memory upon being initialized to execute the schema in FIG. 1.

FIG. 4 shows the instruction format. The operation part of an instruction has a field (of two bits, say) which specifies the Functional Unit required (out of four, say), and a field that specifies the specialized capability of the functional unit that is to be used. Each address field specifies a Register in the Memory which is to receive one copy of each result generated by the instruction. The initial contents of memory Cells for the digital filter example is shown in FIG. 5. The registers used have addresses 0 through 23, and each group of three registers forms one Cell of the Memory. Empty parentheses indicate an empty operand Register waiting to receive a value. In FIG. 5, Cell 1 is enabled and presents the instruction packet $$\left\{ \begin{array}{l} \text{mult},\ 13,\ - \\ x(0) \\ A \end{array} \right\}$$

to the Arbitration Network. Some Functional Unit will compute $$z = A \times x\phi$$

and send the result packet $$\left\{ \begin{array}{c} 13 \\ z \end{array} \right\}$$

through the Distribution Network, and Register 13 in Cell 5 will receive the value $z$.

Figure 6:
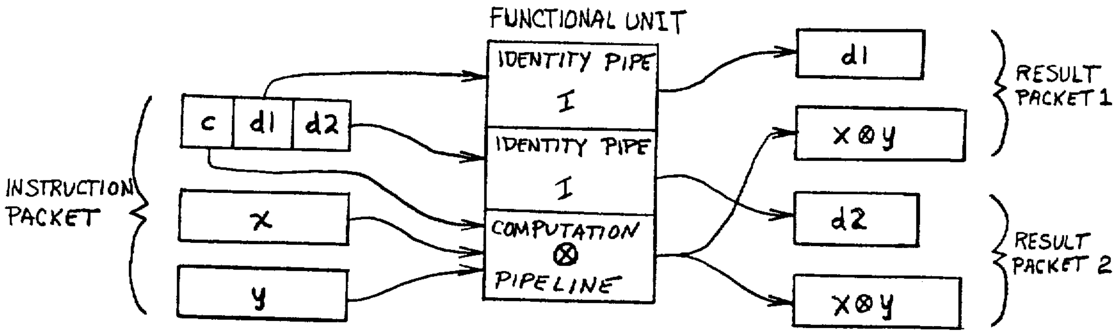
FIG. 6 is a schematic diagram for a Functional Unit.

As illustrated by FIG. 6, each Functional Unit receives from the Arbitration Network all instruction packets directed to it by their operation codes, and in general, delivers two result packets to the distribution network. To realize maximum throughput, each Functional Unit is constructed of three pipelines: one pipeline performs the computation of the result value $z = x \otimes y$ and where $x$ and $y$ are the operands from the instruction packet. The second and third pipeline carry addresses d1 and d2 so these may be associated with the result z when it emerges from the computational pipeline.

Since the data flow form of a program expresses most of the possibilities for concurrent execution of instructions, we can expect that many Cells in the Memory of the processor will be enabled at once. As the Functional Units have high potential throughput, the Arbitration and Distribution Networks are organized to handle many packets concurrently so all sections of the processor are effectively utilized. The arbitration network is designed so many instruction packets may flow into it concurrently from Cells of the Memory, and merge into streams of packets — one stream for each Functional Unit.

Since the Arbitration Network has many input ports and only a few output ports, the rate of packet flow will be much greater at the output ports. Thus a serial representation of packets is appropriate at the input ports to minimize the number of connections to the Memory, but a more parallel representation is required at the output ports so a high throughput may be achieved.

The Controller directs operation of the processor by carrying out operating commands presented to it by a control console and human operator, or by a host computer. The commands are (for illustration) of three kinds:

1. enter-constant *a*, *v* — enter the value *v* in the Memory Register with address a, and set the Register to act as a constant. 2. enter-variable *a*, *v* — enter the value *v* in the Memory Register with address a, and set the Register to act as a variable. 3. empty *a* — empty the Memory Register with address *a*, and set the Register to act as a variable. 4. run *v* — execute the schema represented in the Memory for *v* executions of each operator of the schema.

3. Asynchronous Circuits

Figure 7:
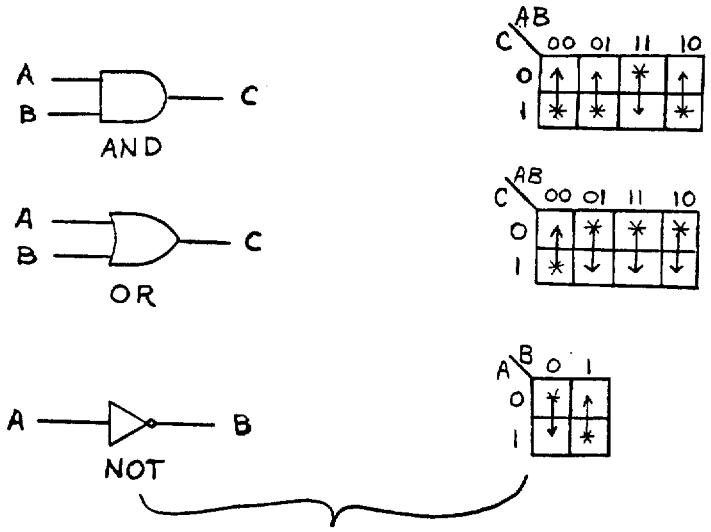
FIG. 7 is the transition diagrams for some elementary switching elements.

One possible construction for the processor is given in the following pages in terms of idealized asynchronous switching circuits. In practice, of course, a realization of the processor would use nonideal elements arranged so that their collective behavior is consistent with the behavior of the idealized circuits. Here we introduce the notation and conventions on which the descriptions are based. An asynchronous circuit is an interconnection of switching elements. Each switching element has a unique output wire which is called the node of the circuit driven by the switching element. Each input wire of each switching element comes from some node of the circuit. At any instant during operation of the circuit each node has an associated value, which is either $\phi$ or 1, and is determined by the switching element that drives the node. The set of values for every node of a circuit is the total state of the circuit. The total state changes with time through the firing of switching elements; firing an element changes the value of its output node (from $\phi$ to 1, or from 1 to $\phi$). The conditions for which a switching element may fire may be specified by a specialized form of Karnaugh map called a transition diagram. Transition diagrams for three common switching elements are given in FIG. 7. Each cell of a transition diagram corresponds to a particular set of values for the input and output nodes of the switching element. Conditions for which a switching element is able to fire are indicated by the presence of an asterisk in the appropriate cell; the condition that holds after firing is shown by an arrow. The initial condition of a circuit is with all nodes at $\phi$, unless stated otherwise.

A system is speed-independent if the correctness of its operation is unaffected by the presence of delay. Two kinds of delay are considered; delay in interconnecting wires, and internal delays in the components that are interconnected. An interconnection of components is called a type 1 speed independent system if arbitrary delays on the interconnecting wires do not affect correctness of system operation. A system is a type 2 speed independent system if its correct operation is not affected by arbitrary delays inserted at the output nodes of system components.

It is attractive from an engineering viewpoint to construct systems as type 1 interconnections of components, for timing consideration may be ignored in designing the physical placement of the components. However, the switching elements introduced so far do not provide an adequate basis for the description of systems as type 1 interconnections of components. In the following paragraphs we describe 15 kinds of basic modules. In subsequent sections a design is given for each section of the processor as a type 1 interconnection of several units, each of which is almost strictly a type 1 interconnection of basic modules.

In the use of basic modules to form units and sections of the processor, a specific communication discipline known as reset signalling is used: A $\phi$-to-1 transition on a wire represents a meaningful event; we say that the wire has sent a signal from the module that drives the wire to the module to which the wire is connected. Before the wire can transmit a subsequent signal, a 1-to-$\phi$ transition must occur; this transition is called a reset of the wire.

4. Basic Modules

4.1. The C-Module

Figure 8A:
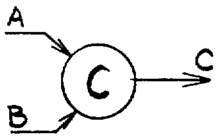
FIG. 8 is a schematic diagram for the C-elements.
Figure 8B:
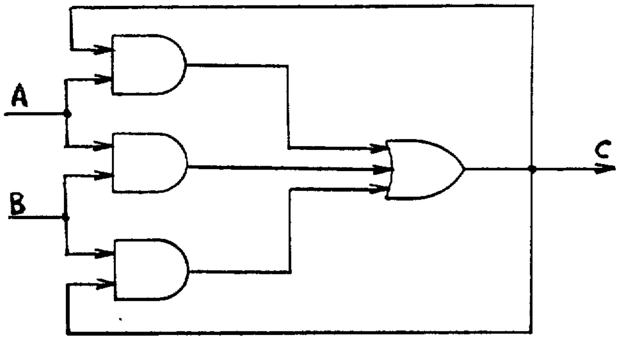
Figure 8C:
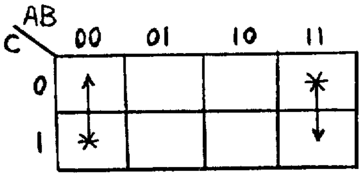

The C-module (FIG. 8) is an important switching element for speed independent systems. The output node of a C-module becomes 1 when both inputs become 1, the output returns to $\phi$ only when both inputs have become 0. The realization of the C-module shown in FIG. 8 is neither a type 1 nor a type 2 connection of switching elements, yet its behavior will be consistent with the given transition diagram if delays within the circuit are properly controlled. The circle in the transition diagram indicates the initial state of the C-module.

4.2. Data Switch Module

Figure 9A:
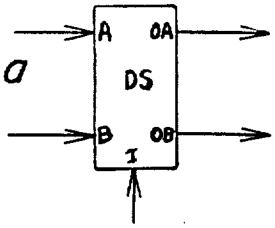
FIG. 9 is a schematic diagram for the data switch module.
Figure 9B:
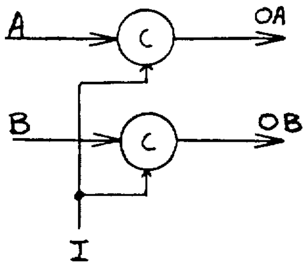

The use of the C-module as a synchronization element and as a buffer storage element is demonstrated in the design of the data switch (FIG. 9). This module waits for signals to arrive on wire I and one of wires A and B. It then sends a signal on the output wire OA or OB corresponding to the active input wire. The output wire resets only when both active input wires are reset. For speed independent operation, it is necessary to use the data switch module only where signals cannot arrive on both input wires A and B without an intervening reset.

The circuit for the data switch given in FIG. 9 is a type 2 interconnection. Delay in the wire from input I to the unused C-module may cause a false output the next time that side of the switch is signalled. Nevertheless, if there is negligible delay in the wires, the circuit will exhibit the behavior specified by the transition diagram.

Figure 10A:
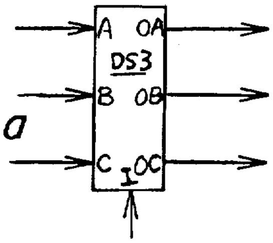
FIG. 10 is a schematic diagram for the three-wire data switch module.
Figure 10B:
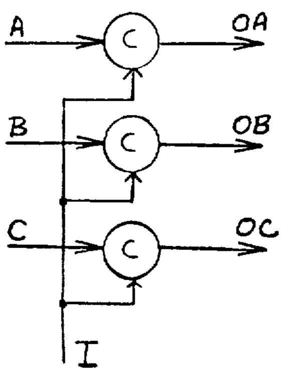

Data switch modules with more than two pairs of corresponding input and output wires are also used. A three-wire data switch is shown in FIG. 10. For correct operation, only one of the three input wires A, B, C may be active at a time.

The multiple data switch (FIG. 11) is three simple data switches combined into one module. A signal on input wires I1, I2, or I3 leads to a signal on one of the pair of corresponding output wires, according as a signal arrives on input A or B. For correct operation, wires A and B must not be active at the same time.

4.3. Gate Module

The gate module shown in FIG. 12 is a basic element for controlling parts of a system that perform cyclic activity. A channel for data flow from input I to output O is opened or closed by a signal at inputs S or R, respectively. The information input I need not be $\phi$ when input S is raised; data may be waiting at the input for the channel to be opened. However, data transmission must have stopped and the input I and output O must be $\phi$ before the channel is closed by the arrival of a reset signal on wire R. Also, inputs S and R must not be simultaneously active. The implementation shown uses the S and R signals to set and reset a flip-flop, which allows signals on I to pass through to O when set, and allows no signals to pass when reset. The arrival of an S or an R signal is acknowledged on AS or AR respectively.

4.4. Select Module

Figure 13:
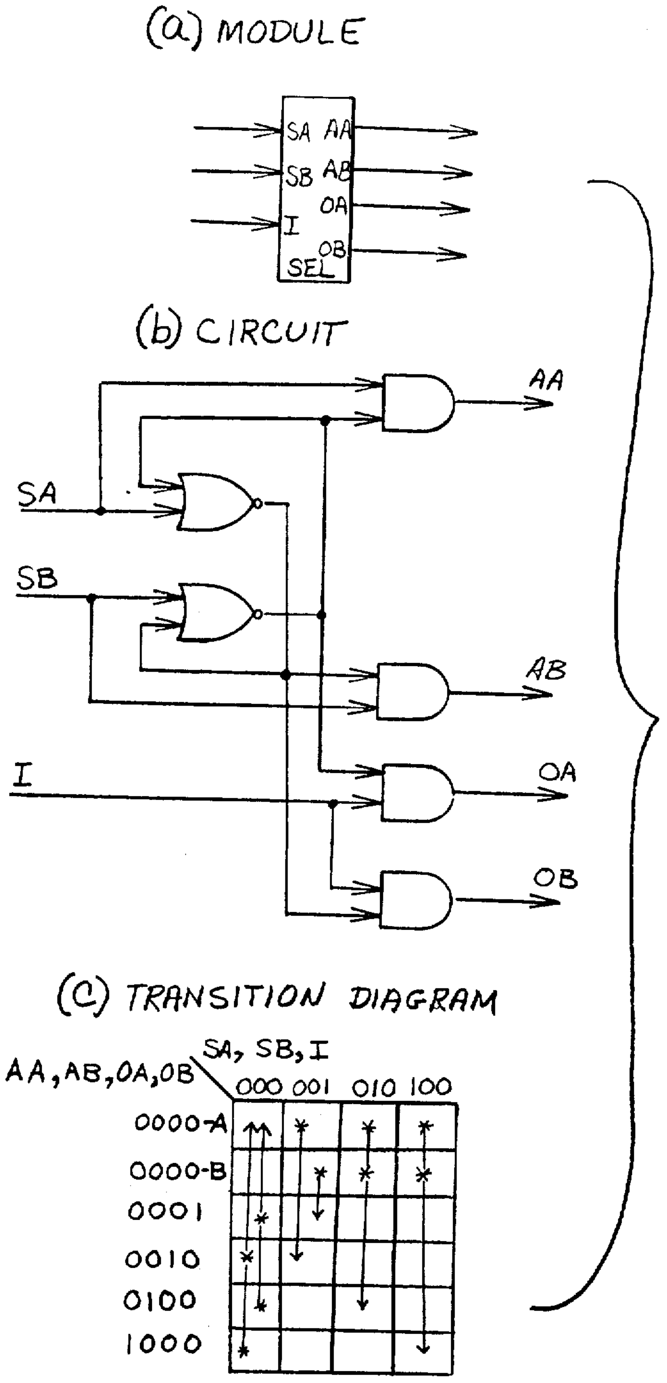
FIG. 13 is a schematic diagram for the select module.

The select module (FIG. 13) is a multiplexer, routing signals arriving at input I to output OA or OB according to the state of the module. A signal on an enable input (SA or SB) sets the module to send signals out over OA or OB respectively and is acknowledged on AA or AB. Inputs A and B must not be simultaneously active, and input I and outputs OA, OB must be $\phi$ while the module is being set. The design is similar to that of the GATE module.

4.5. OR, NOT Modules

Figure 14:
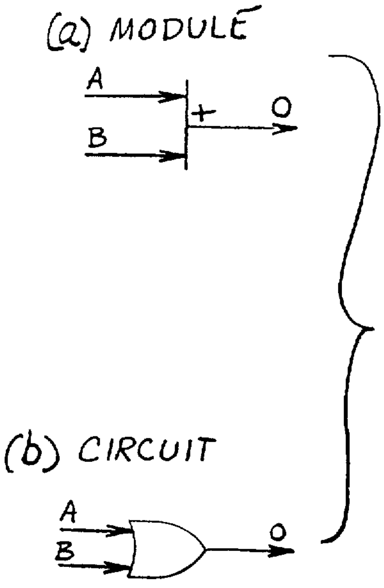
FIG. 14 is a schematic diagram for the OR module.

FIG. 14 shows a convention used to represent the Boolean OR gate, which is an important module in type 1 modular circuits. The OR module is drawn as a line on which lines representing input wires terminate in arrowheads. Only one input wire of an OR module may be active at a time.

Figure 15:
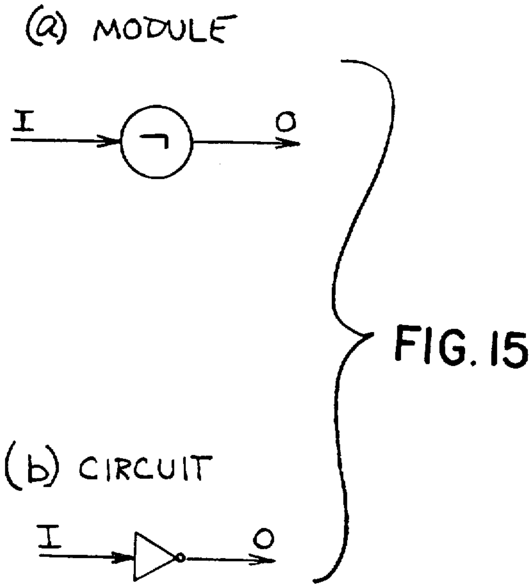
FIG. 15 is a schematic diagram for the NOT module.

The NOT module (FIG. 15) performs the function of an inverter. A transition occurs at the output of the module for each transition occurring at its input.

4.6. AND Module

Figure 16:
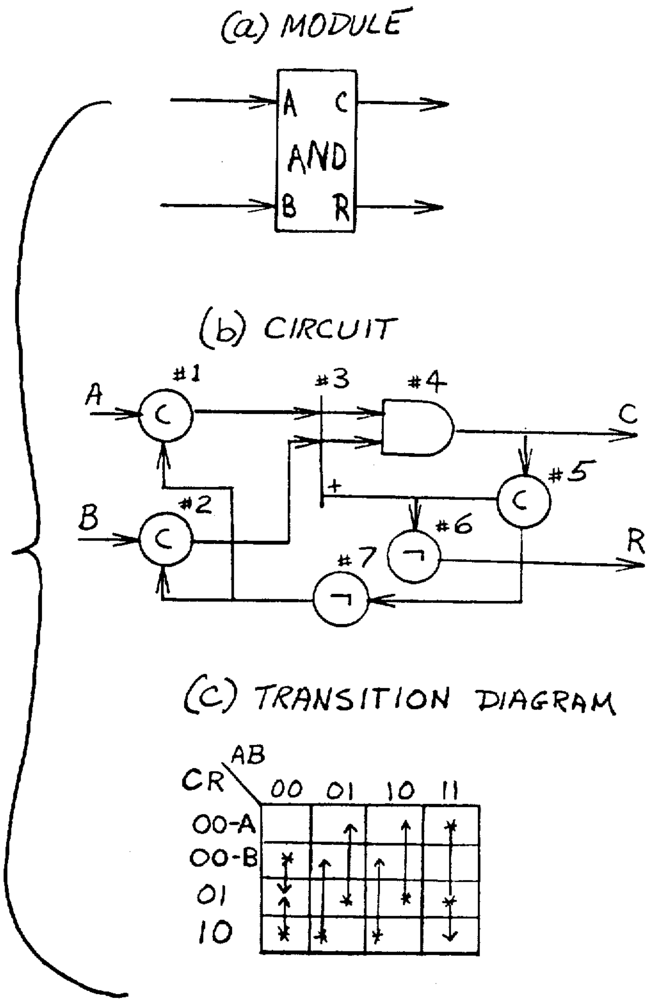
FIG. 16 is a schematic diagram for the AND module.

The conventional AND gate is not useful in speed-independent circuit design. Nevertheless, a module having related behavior is useful for describing the signalling module to be introduced. This AND module is shown in FIG. 16. Both inputs A and B must make $\phi$-to-1 transitions before a $\phi$-to-1 transition occurs at output C. The output makes a transition to $\phi$ when either input resets, but will not become 1 again until after both inputs have reset. Output R is used to acknowledge the resetting of the inputs of the module; it is 1 initially, and returns to 1 after both inputs have reset to $\phi$. The inputs must not be raised to 1 again before the reset output R becomes 1.

Operation of the circuit is as follows: Initially, inputs A and B are $\phi$, causing the output of C-module ( # 5) to be $\phi$ and the output of inverter ( # 7) to be 1, enabling one input each of ( # 1) and ( # 2). Since the outputs of ( # 1) aND ( # 2) are $\phi$, the output of the OR module ( # 3) is $\phi$ and reset link R is a logical 1. When an input, say A, changes to 1, the corresponding C-module is enabled; in this case the output of ( # 1) becomes 1, and the output of ( # 3) changes to 1, enabling one input of ( # 5) and at the same time removing the reset signal. When the other input (B) changes to 1, the AND gate ( # 4) is enabled, and the output of the module C will become 1. At the same time the enabling of ( # 5) will place a $\phi$ on the output of ( # 7). Thus, as soon as an input signal is removed, the output will become $\phi$ and will not become 1 again until both inputs have gone to $\phi$, since the other input which has not reset would still be maintaining a 1 on one input of ( # 5), preventing it from resetting and effectively disabling ( # 1) and ( # 2). When both inputs reset, ( # 3) output becomes $\phi$, ( # 5) resets, the reset link is enabled, and the input C-circuits are re-enabled.

The AND module is a type 2 interconnection. If one were to place a large delay in one of the wires between ( # 3) and ( # 4), a false output could result. This is due to the problem which the AND module is designed to solve; one has no method of determining when both inputs of AND gate ( # 4) have reset to $\phi$.

4.7. Synchronization Module

Figure 17:
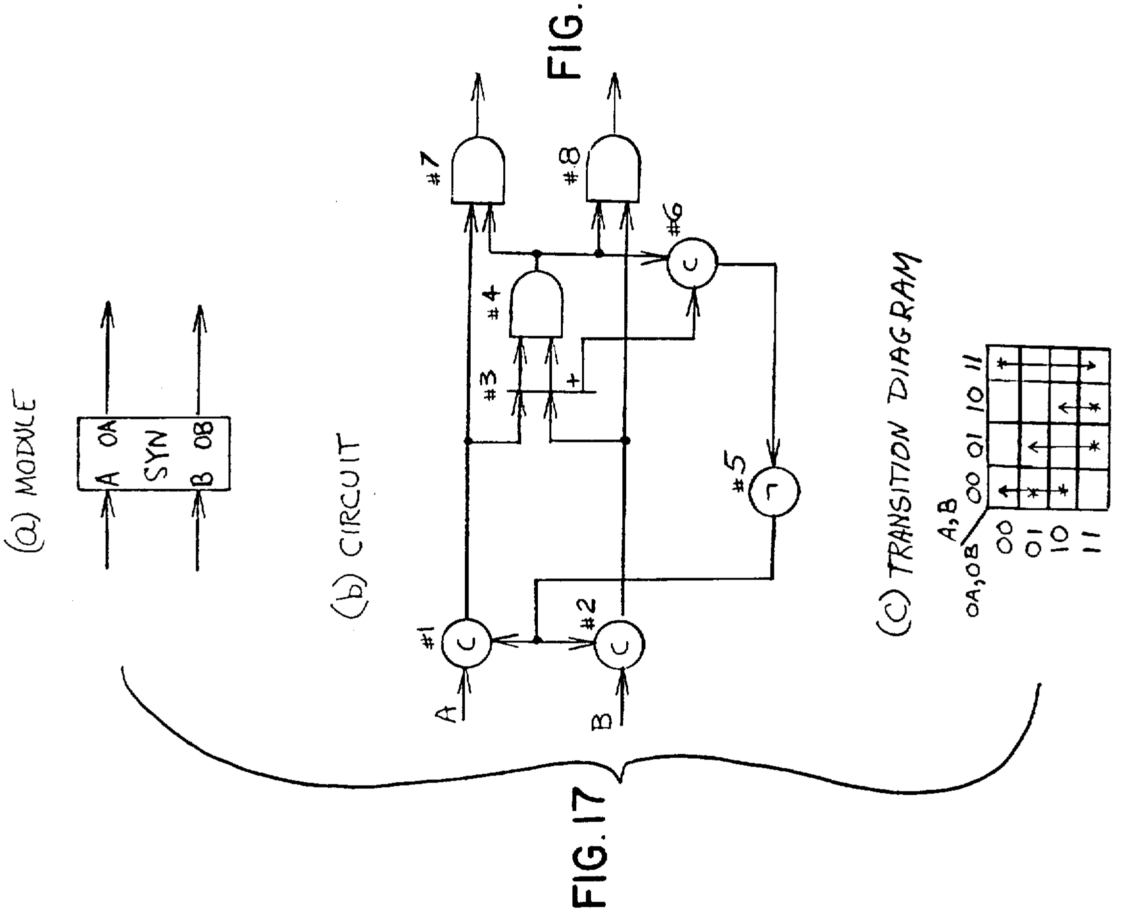
FIG. 17 is a schematic diagram for the synchronization module.

The synchronization module (FIG. 17) operates using the same principle as the AND module. Outputs OA and OB make a $\phi$-to-1 transition only after inputs A and B both become 1. Each output resets to $\phi$ only after its corresponding input has reset, and both input and output pairs must reset before the two outputs can become 1 again. However, it is not necessary for both inputs to be $\phi$ together. One can become $\phi$ and then be set to 1 after its associated output has reset, yet the output will not become 1 again until the other input-output pair resets and the other input makes another $\phi$-to-1 transition. When both inputs become 1, AND gates ( #4, # 7, # 8) are enabled, and their outputs become 1. When either input returns to $\phi$, the corresponding output will become $\phi$. The construction of this module is similar to that of the AND module, and it is also type 2 speed independent.

4.8. Signaling Module

Figure 18:
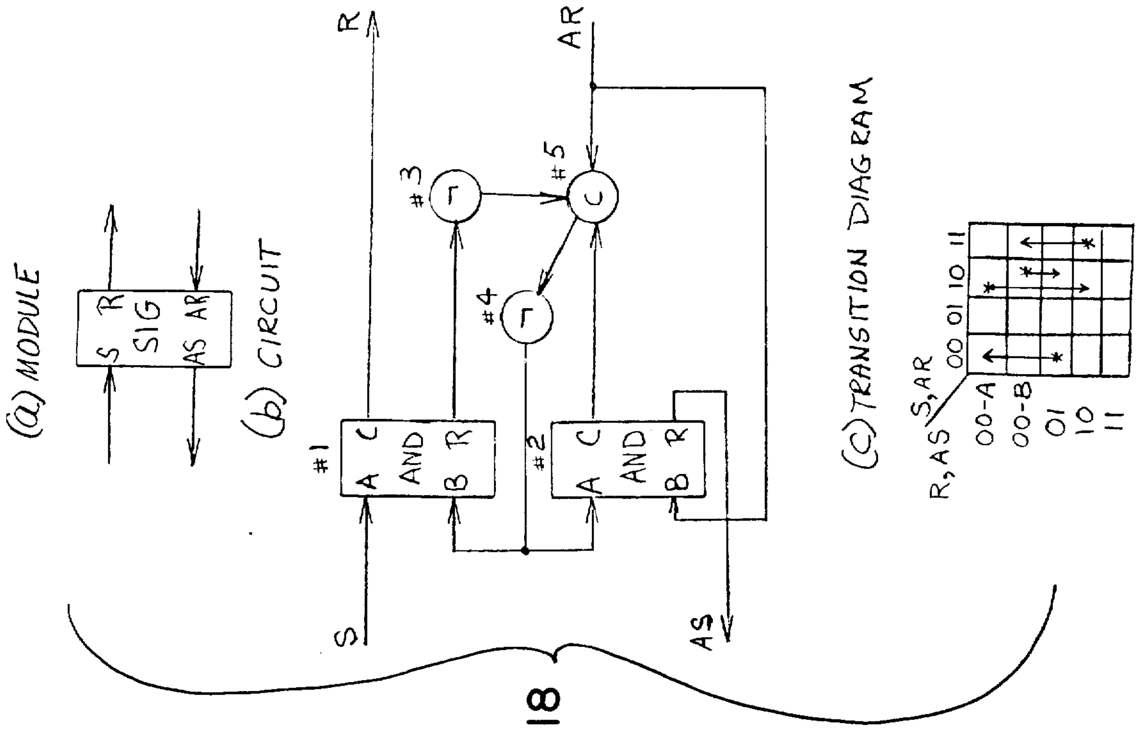
FIG. 18 is a schematic diagram for the signaling module.

The signaling module shown in FIG. 18 is used for controlling sequences of actions by parts of a system. The module acknowledges an enable signal on input S by a signal on AS only after output R becomes 1, is acknowledged by a signal on Ar, and both R and AR have reset to $\phi$.

Initially, all wires are $\phi$, and the output of C-module ( # 5) is $\phi$, causing inverter ( # 4) to set its output to 1, enabling one input of each AND module ( # 1, # 2). A start signal on S enables ( # 1) and causes an enable signal to be sent out on R. Output R of ( # 1) becomes $\phi$ allowing the output of ( #3) to become 1. An acknowledgement on AR enables ( #2), whose output becomes 1, enabling ( #5). The output of ( # 5) changes to 1, and the output of ( # 4) changes to $\phi$, removing the signal on wire R and output C of ( # 2). When AR resets, ( # 2) will reset, enabling AS to acknowledge that the R/AR cycle has completed, and that the start signal can be removed. Upon its removal output R of ( # 1) becomes 1, resetting ( # 5). This causes the output of ( #4) to become 1, resetting AS and reenabling ( #1) to accept another input.

This module is the first example of a type 1 speed independent interconnection. Only one element of the circuit is ever enabled at any time. Thus, any delay in the firing of that element or in a wire between elements will not affect circuit operation.

4.9. Sequence Module

Figure 19:
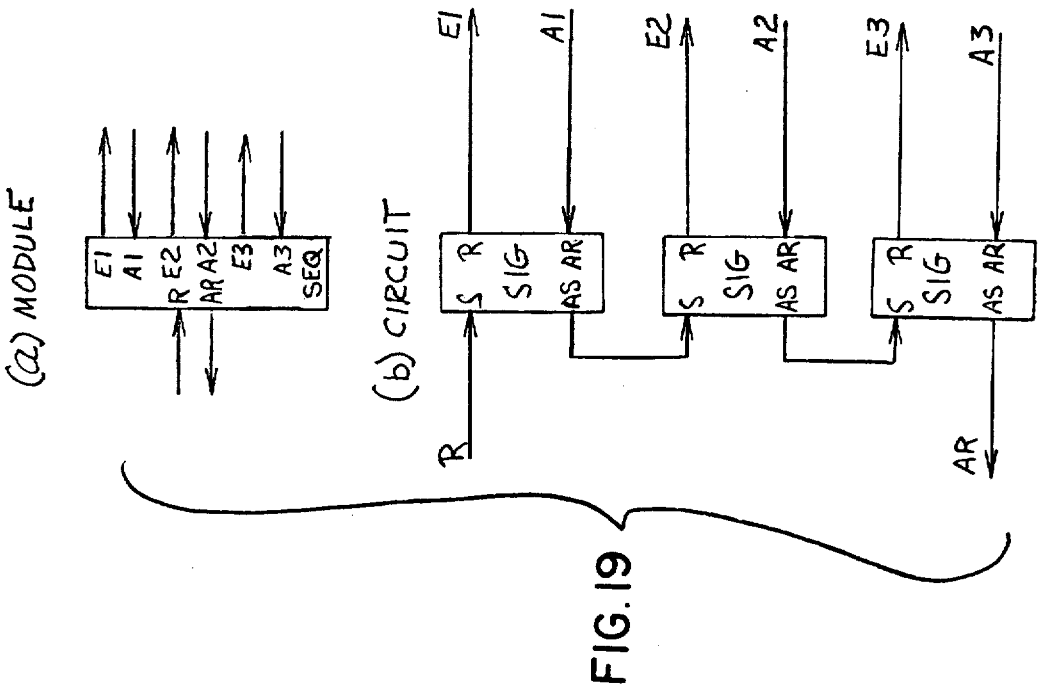
FIG. 19 is a schematic diagram for the sequence module.

Activities by parts of a system may be sequenced by a cascade of SIG modules. The sequence module shown in FIG. 19 is implemented in this way. The module operates by causing a cycle of signal and reset transitions of the R and AR wires of each SIG module before the next SIG module is enabled. When the final SIG module completes its cycle, an acknowledge signal occurs on AR. Wires R and AR reset without further transitions of the remaining input and output wires of the SEQ module.

4.10. Counter Module

Figure 20:
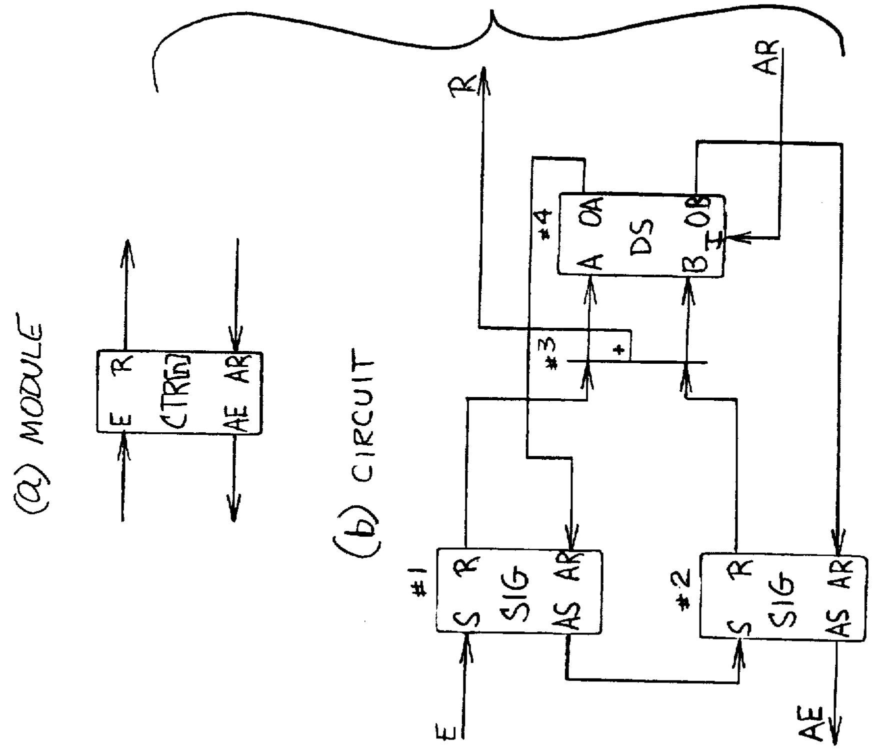
FIG. 20 is a schematic diagram for the counter module.

The SIG module provides the basis for implementing counter circuits (FIG. 20). After receiving an enable signal on wire E, a CTR[n] module performs n complete cycles of signal and reset events on wires R and AR, and then returns an acknowledge signal on AE. Resetting E leads to resetting of AE without further transitions of wires R and AR.

The circuit shown is for one stage of a binary counter. The two SIG modules ( #1, #2) generate two enable signals on wire R in sequence through OR module ( #3). Acknowledge signals on AR are directed to the appropriate SIG module by data switch ( #4). Since ( #1) must complete its cycle before ( #2) is enabled, the inputs A and B of the data switch will not be siimultaneously active.

Counter modules of *n* states may be constructed using various combinations of SIG, DS and OR modules.

Both the counter and the sequence module operate as type 1 speed independent circuits. They are formed of type 1 interconnections of elements operating in a type 1 manner. Such an interconnection is always type 1 speed independent.

4.11. Bit Pipeline Module

Figure 21:
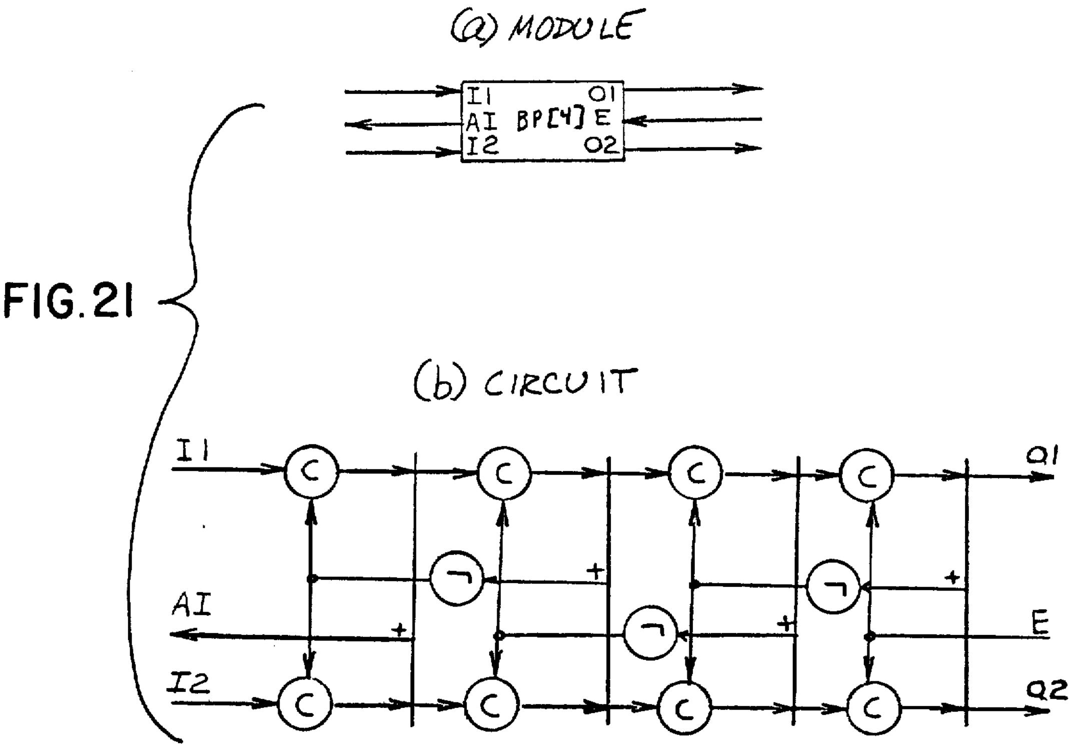
FIG. 21 is a schematic diagram for the bit pipeline module.

The memory of a system can be constructed of asynchronous elements linked to other system components by a speed independent interconnection. One such memory element is the bit pipeline module shown in FIG. 21. Signals on wires I1, I2 cause a 1 or $\phi$ to be entered into the pipeline, after which an acknowledge signal is returned on wire AI. Up to n bits may be entered into a pipeline module BP[2n]. When the pipeline is not empty and an enable signal is present on wire E, the pipeline emits its longest held bit by a signal on O1 or O2.

The pipeline module is constructed of a cascade of data switch modules with feedback connections using OR modules and NOT modules arranged so that bits advance through the data switches until all alternate stages hold information. As in the case of a data switch module, inputs I1 and I2 must not be simultaneously active.

4.12. Arbitration Module

Figure 22:
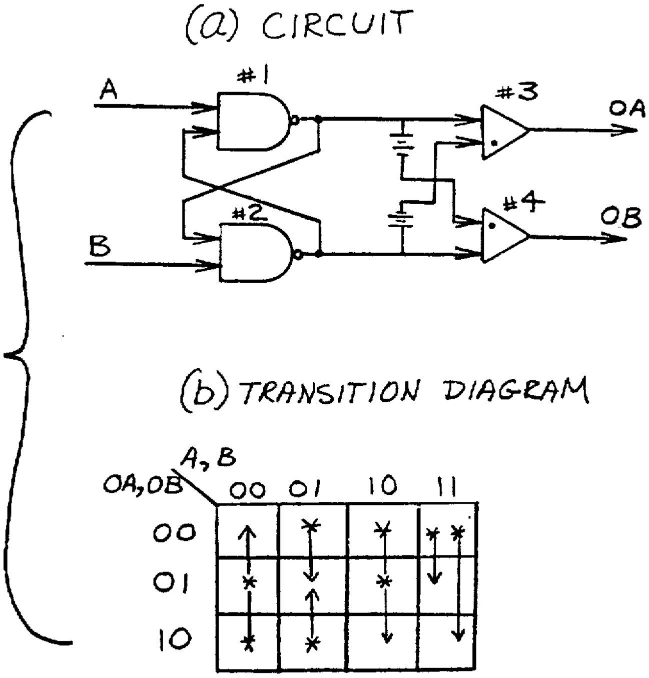
FIG. 22 is a schematic diagram for the arbiter.
Figure 23:
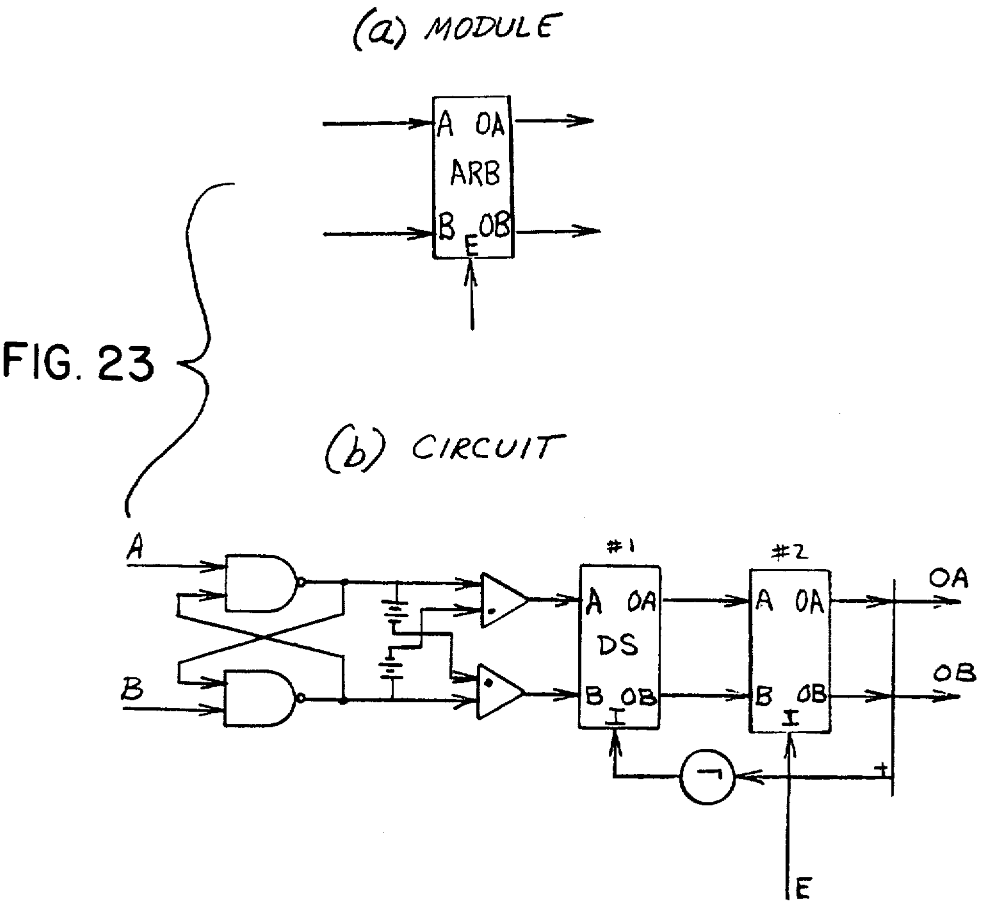
FIG. 23 is a schematic diagram for the arbitration module.
Figure 23:
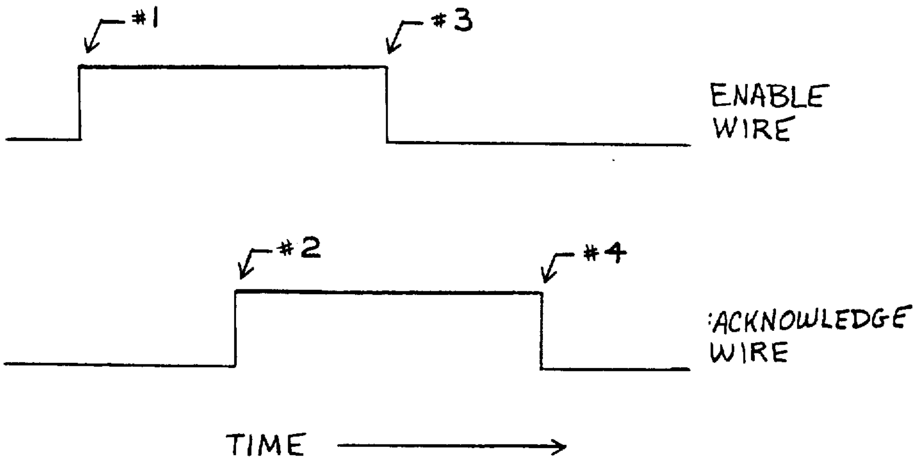

Often there is competition for resources between two units of a system. For example, two memory cells may wish to use the same functional unit at the same time. Such conflicts can be resolved by a module known as an arbiter (FIG. 22). The first input wire (A or B) to make a $\phi$-to-1 transition will set the latch ( #1, #2) and disable the other input. If both inputs arise simultaneously, one will disable the other. The transition diagram (FIG. 23*b*) demonstrates the indeterminacy of this action; there are two possible transitions which can occur when both inputs go to 1.

Difference amplifiers ( #3, #4) produce an output signal when the outputs of the latch differ by an amount greater than the fixed offset voltage. This prevents any false output signals that may result if the latch enters its metastable state.

To use the arbiter in the speed independent circuits under consideration, it must be refined so that it itself is enabled for each transaction on a separate enable wire. The arbitration module (FIG. 23) is a type 2 interconnection of an arbiter and two data switches which prevent the module from being engaged until an enable signal has been received on enable wire E.

Initially, wire E is at $\phi$, the output of data switch ( #2) is $\phi$ and data switch ($\phi$1) is enabled. An output of the arbiter will appear on the input of ( #2) and will be transferred to its output when an enable signal is received. Data switch ( #1) is then disabled. The arbiter can now reset, but its new output will not pass through ( #1) until the E wire has reset and the output of ( #2) has reset. The output of the arbiter will then be present on the input of ( #2), waiting for the next enable signal on E.

5. Communication Conventions and Packet Representation

Each of the seven sections sections of the processor is a group of interconnected units, which is turn are collections of interconnected basic modules. Each set of wires that connects one unit to another is called a link, and consists of one or more groups of wires. Within each group of wires a strict signaling discipline is observed. In the quiescent condition of the processor (just turned on, or awaiting the next command), all wires are reset. The wires of a group are divided into enable wires and acknowledge wires. The units of the processor are designed so that signaling in each group follows a repeated cycle of four steps:

1. Signals are sent over at least one enable wire.
2. Signals are returned over at least one acknowledge wire.
3. The enable wires used in step (1) are reset.
4. The acknowledge wires used in step (2) are reset.

All events of one step must occur before any event of the following step.

Figure 24:
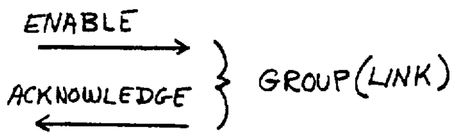
FIG. 24 is an example of link signaling discipline.

One cycle or transaction using this signaling discipline is illustrated for a two-wire link or group in FIG. 24. The steps are: enable signal (24 #1); acknowledge signal (24 #2); enable reset (24 #3); acknowledge reset (24 #4).

Figure 25:
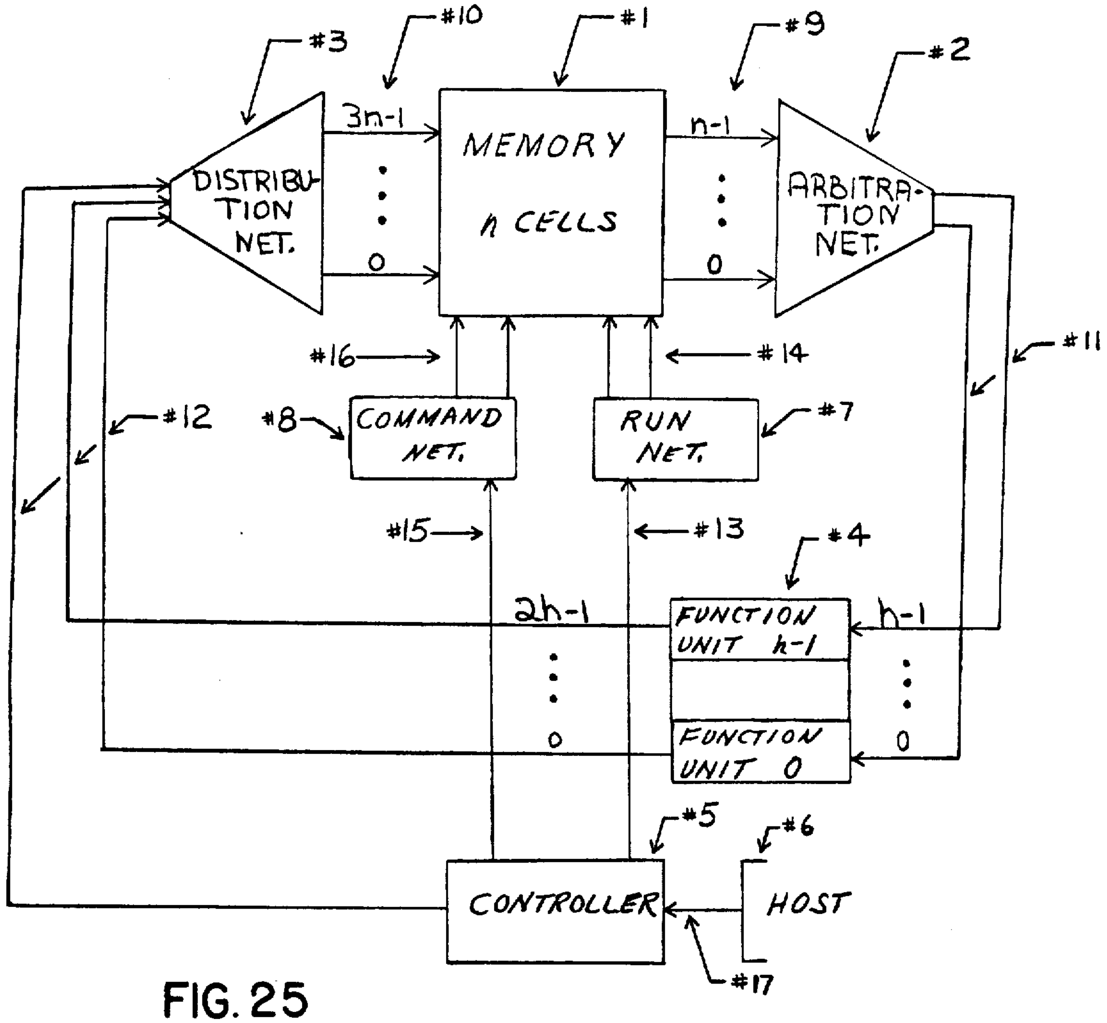
FIG. 25 is an example of the communication conventions between processor sections.

In FIG. 25, the links interconnecting the seven sections of the processor are specified. The following paragraphs describe the function and format of each link shown in the figure. We suppose the Memory section consists of n memory Cells, that each Register Unit holds an m-bit word, and that q-bit addresses are used to identify the Register Units of the Memory.

5.1. Memory to Arbitration Network

Figure 26:
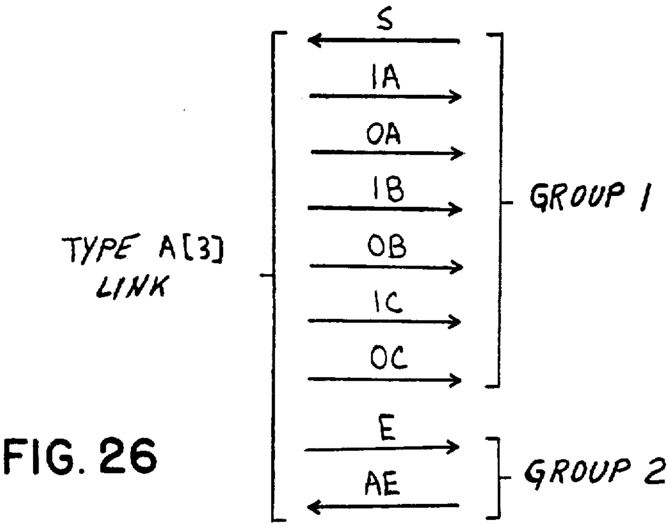
FIG. 26 is an example of the structure of a type A link.

The Arbitration Network (25 #2) accepts instruction packets from memory cells (25 #1) via links (25 #9) of type A[3] which have the structure shown in FIG. 26. The Arbitration Network is requested to accept a packet by an enable signal on wire E of group 2. Then the packet contents are transmitted from the three Register Units of the Memory Cell in serial fornat by m signal/reset cycles of the wires of group 1, in which wire S is the enable wire. When the m cycles of transmission are completed, the Arbitration Network sends an acknowledge signal on wire AE of group 2. Then resets are exchanged on group 2 and the link returns to its quiescent condition.

5.2. Distribution Network to Memory

Figure 27:
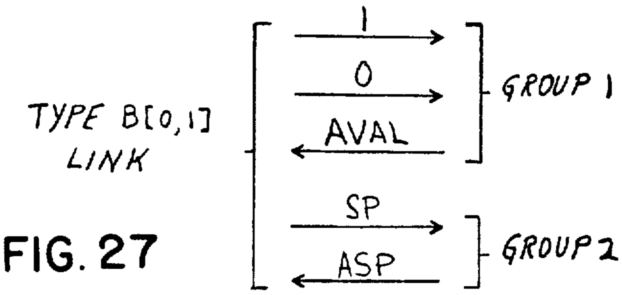
FIG. 27 is an example of the structure of a type B link.

The Distribution Network (25 # 3) sends result packets to Register Units of the Memory (25 # 1) via links (25 # 10) of type B[0, 1] which have the structure shown in FIG. 27. The result packet, which at this point is an m-bit word in serial format, is delivered to the Register Unit over group 1 of the link by m transactions using enable wires $\phi$ and 1 and acknowledge wire AVAL. Then an enable/acknowledge transaction on wires SP and ASP informs the Register Unit that all transactions required to deliver the packet are completed.

5.3. Arbitration Network to Functional Units

The links (25 # 11) that transmit instruction packets from the Arbitration Network (25 # 2) to the Functional Units (25 # 4) must handle the packets in their most parallel format. These links are of type A[$r$], meaning that group 1 consists of $r$ pairs of acknowledge wires and one enable wire, and permit a Functional Unit to accept an entire packet by one transaction on group 1 and an enable/acknowledge exchange on wires E and AE. If addresses are represented by $q$ bits [$3n \leq 2^q$] then $r = 2m + 2q + s$, where s bits of an instruction specify to the Functional Unit the specialized operation to be performed.

5.4. Functional Units and Controller to Distribution Network

Links (25 # 12) deliver result packets of $r = m + q$ bits from Functional Units (25 # 4) and the Controller (25 # 5) to the Distribution Network. These links are of type B[$m$, $q$] which means that the link has three groups: group 1 has $q$ pairs of enable wires and one acknowledge wire AADD for sending $q$ address bits in parallel; group 2 has $m$ pairs of enable wires and one acknowledge wire AVAL for sending m value bits in parallel; and group 3 consists of the enable/acknowledge wires SP and ASP. Transactions on group 1 and group 2 deliver the packet, and a transaction on group 3 informs the Distribution Network that the packet has been delivered.

5.5. Controller to Memory

Figure 28:
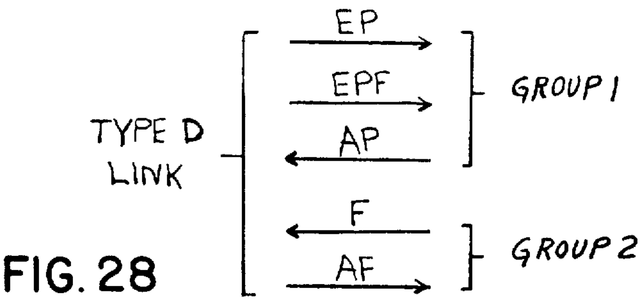
FIG. 28 is an example of the structure of a type D link.

The Controller (25 # 5) controls the execution of the program in the Memory (25 # 1) in response to run commands by signals sent through the D-link (25 #13), the Run Network (25 #7) and D-links (25 # 14). The structure of a type D link is shown in FIG. 28. Each EP/AP transaction on group 1 represents a request to the Memory for one cycle of program execution (one execution of each instruction). An EPF/AP transaction marks the end of a series of execution requests and indicates that an F/AF transaction over group 2 is to be sent by each Cell of the Memory when all requested execution cycles are completed.

Figure 29:
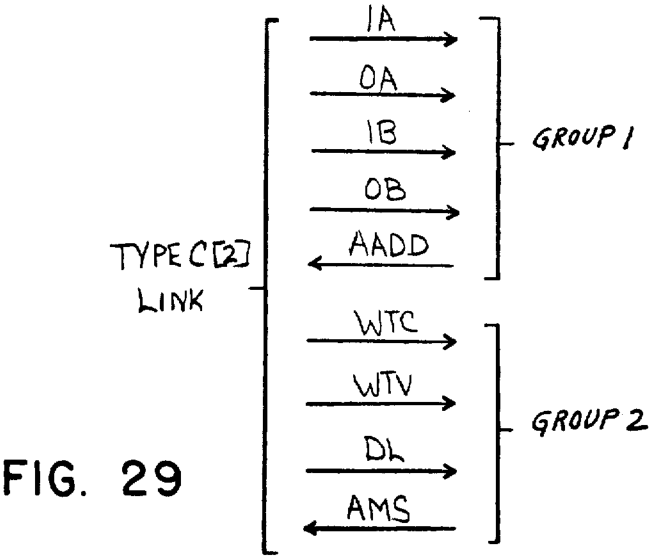
FIG. 29 is an example of the structure of a type C link.

The Controller (25 #5) transmits the commands enter-constant, enter-variable and empty to Register Units of the Memory (25 # 1) through the C[$q$]-link (25 # 15), the Command Network (25 # 8), and C[0]-links (25 #16). The structure of a type C[2] link is shown in FIG. 29. The three commands are signalled by WTC/AMS, WTV/AMS and DL/AMS transactions, respectively, on the wires of group 2 where the acknowledge signal means that command execution is completed. Group 1 consists of enable wires that carry a 2-bit address and an address acknowledge wire AADD.

5.6. Host to Controller

Figure 30:
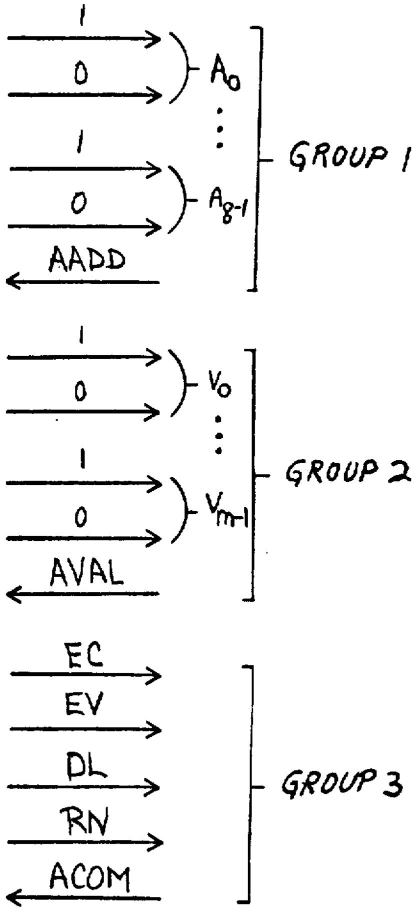
FIG. 30 is an example of the structure of the Host/Controller link.

Link 25 #17) conveys commands from the Host (25 #6) to the Controller (25 # 5) and has the structure shown in FIG. 30. Transactions EC/ACOM, EV/ACOM, DL/ACOM, and RN/ACOM on group 3 represent commands enter-constant, enter-variable, delete and run, respectively. A transaction on group 1 delivers a q-bit address to the controller for an enter command or an empty command. A transaction on group 2 delivers an m-bit value for transmission to a Register Unit by an enter command, or a value specifying the number of requested execution cycles for a run command.

6. Process Description

Each section of the processor, Memory (25 #1), Functional Units (25 #4), Controller (25 # 5), Arbitration Network (25 #2), Distribution Network (25 #3), Run Network (25 # 7), and Command Network (25 # 8), is built as an interconnection of simpler units. The following paragraphs describe each unit type in terms of an interconnection of basic modules.

6.1. Memory

Figure 31A:
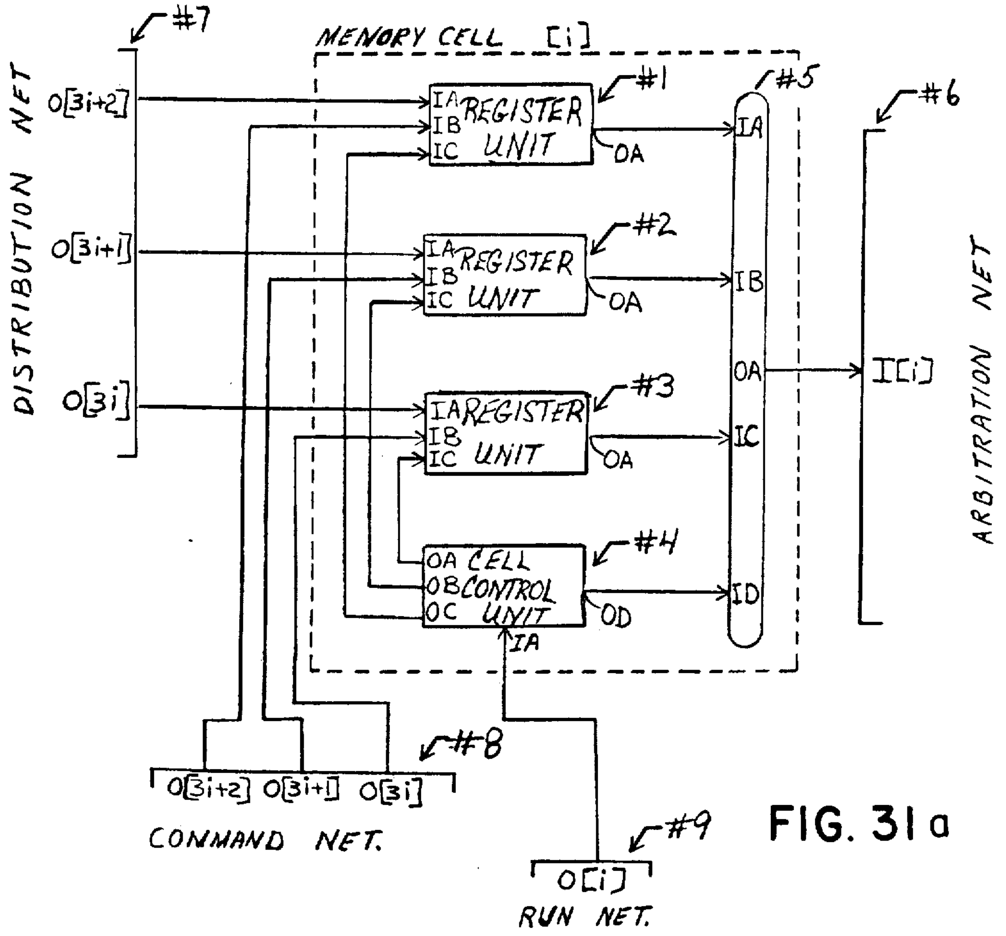
FIG. 31 is a block diagram of the Memory organization.
Figure 31B:
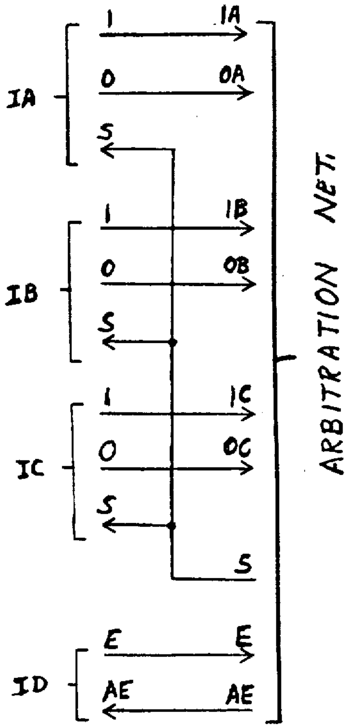

The Memory consists of n Register Units organized into Cells as shown in FIG. 31. Each Cell contains three Register Units (31 #1, 31 #2, 31 #3) having consecutive addresses, and a Cell Control Unit (31 # 4). Type B[0,1] links transmit values of result packets from the Distribution Network (31 # 7) to the IA input ports of the Register Units. Links from output ports OA of the three Register Units and port OD of the Cell Control Unit combine (31 #5) into a type A[3] link, as shown in FIG. 31*b*, which delivers instruction packets to the Arbitration Network (31 #6). An instruction packet consists of three m-bit words: an instruction from Register Unit (31 #1), an operand from Register Unit (31 #2), and a second operand from Register Unit (31 #3).

The Run Network (31 # 9) controls execution of instructions by a Type D link connected to input port IA of the Cell Control Unit (31 # 4). The Command Network (31 # 8) controls emptying of Register Units, entering of values in Register Units, and the setting of Register Units to function as constants or variables, by Type C links connected to input port IB of the Register Units.

6.1.1. Register Unit

Figure 32:
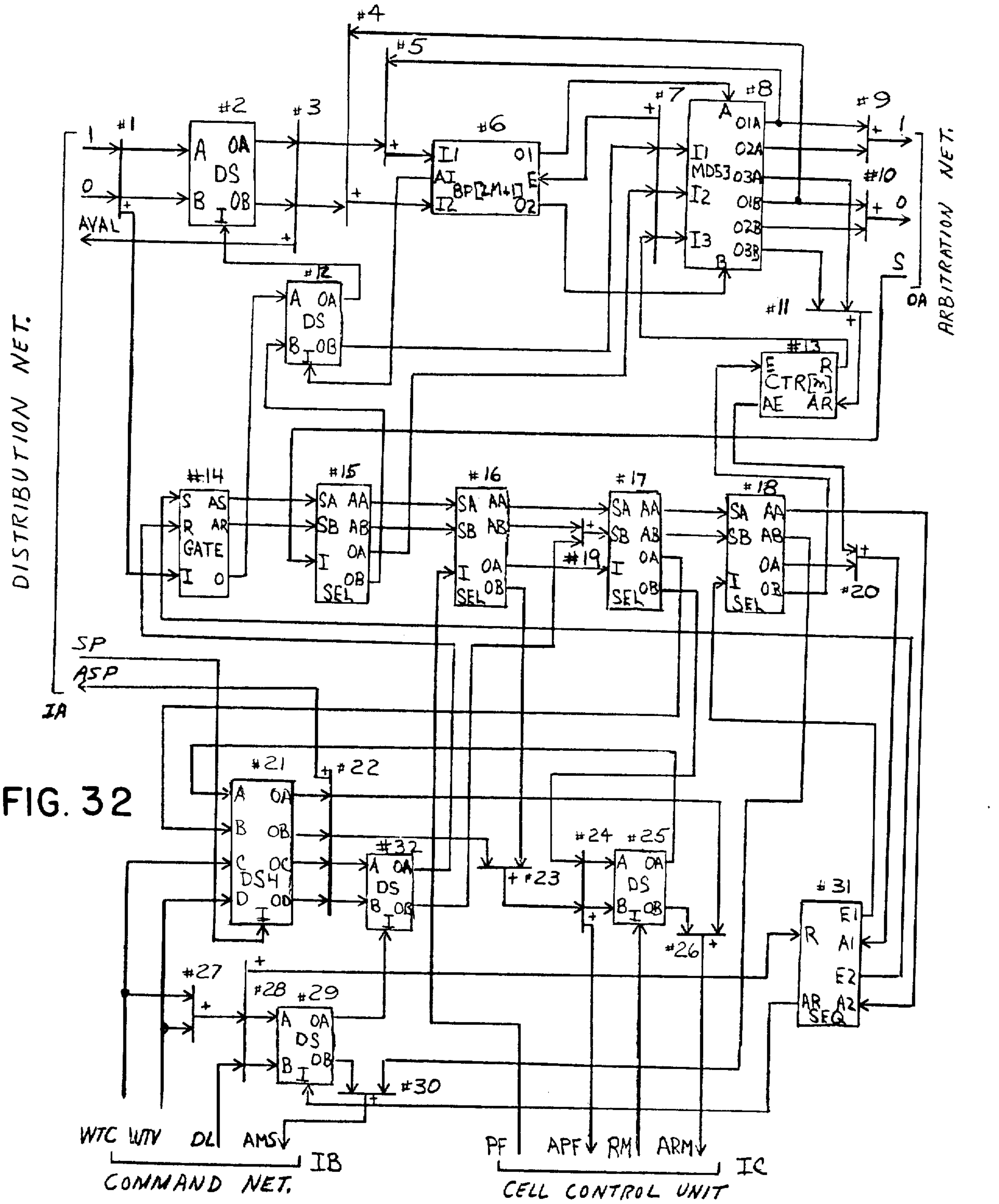
FIG. 32 is a schematic diagram for a Register Unit.

The construction of a Register Unit from basic modules is shown in FIG. 32. An m-bit instruction or operand is held in the bit pipeline module (32 #6). Whether the Register Unit is to treat the word in the pipeline (32 #6) as a constant or variable is represented by the state of GATE module (32 #14) and SEL modules (32 #15, 32 #16). When holding a constant, the GATE module (32 # 14) is reset and SEL modules (32 #15, 32 #16) are set for output OB. The opposite conditions hold when the Register Unit holds a variable. The condition of a Register Unit when the processor is quiescent (not executing a command) is either empty or full, according as the pipeline module (32 #6) is empty or holds an m-bit value. This difference affects operation of the Register Unit and is recorded in SEL modules (32 #17, 32 #18), the modules being set to their OA output for the empty quiescent condition of the Register Unit. The GATE and Sel modules change condition only in response to enter or empty commands.

One cycle of execution activity occurs in response to an enable signal on wire IC.PF. If the Register Unit is in constant mode (32 #16) an acknowledge signal is generated via (32 #23, 32 #24) on IC.APF, which informs the Cell Control Unit that the Register Unit contains a value ready for transmission to the Arbitration Network. If the Register Unit is in variable mode (32 #16) and is empty (32 #17), generation of the acknowledge signal on IC.APF is delayed (32 #21, 32 #23, 32 #24) until an enable signal on IA.SP indicates the pipeline module (32 # 6) has been filled by a value from the Distribution Network. An enable signal on IC.RM signifies that the Arbitration Network has received an entire instruction packet. In the two cases just considered, an acknowledge signal on IC.ARM is generated immediately via (32 #25, 32 #26). The initial condition of the Register Unit is reestablished by resets in sequence on IC.PF, IC.APF, IC.RM and IC.-ARM. If the Register Unit is in variable mode and is full, an enable signal on IC.PF immediately generates an acknowledge on IB.APF via modules (32 #16, 32 #17, 32 #24). In this case, module (32 #25) causes the acknowledge signal on IC.ARM. to be delayed via (32 #21) until an enable signal occurs on IC.RM indicating the instruction packet is entirely accepted by the Arbitration Network, and an enable signal appears on IA.SP indicating that the Register Unit has been refilled by a result packet.

The multiple data switch module (32 #8) directs the flow of bits leaving the pipeline module (32 #6). Outputs O1A, O1B of (32 #8) are active during program execution if the Register Unit is in constant mode; in this case bits from (32 #6) are directed to output port OA and are also recirculated into (32 #6) via modules (32 #4, 32 #5). Outputs O2A, O2B, of (32 #8) are active for program execution in variable mode. Outputs O3A, O3B of (32 #8) are used to empty the pipeline module under control of the m-state counter module (32 #13) in response to an empty command. Data switch module (32 #2) gates bits into the pipeline module from port IA during program execution in variable mode, and for filling the pipeline in response to enter commands. Data switch module (32 #12) directs input acknowledge events from the pipeline as appropriate for filling from port IA (output OA), or recirculating a constant (output OB). Modules (32 #14, 32 #15) set up signal paths for constant mode or variable mode operation.

The commands enter-constant, enter-variable and delete are signalled to the Register Unit through port IB. For each of the three commands, the first step is to empty the pipeline if it is full (32 #18, 32 #13, 32 #20), to set the GATE and SEL modules (32 #14, 32 #15, 32 #16) to indicate variable mode, and to set SEL modules (32 #17, 32 #18) to indicate empty. These actions are controlled by the sequence module (32 #31). Data switch module (32 #29) causes an immediate acknowledge signal on IB.AMS if the command was empty. In the case of the two enter commands, modules (32 #21, 32 #32) cause a wait until the pipeline has been filled. Then modules (32 #14, 32 #15, 32 #16) are set for constant mode if the command is enter-constant, and, for both enter commands, modules (32 #17, 32 #18) are set to indicate a filled pipeline.

6.1.2. Cell Control Unit

Figure 33:
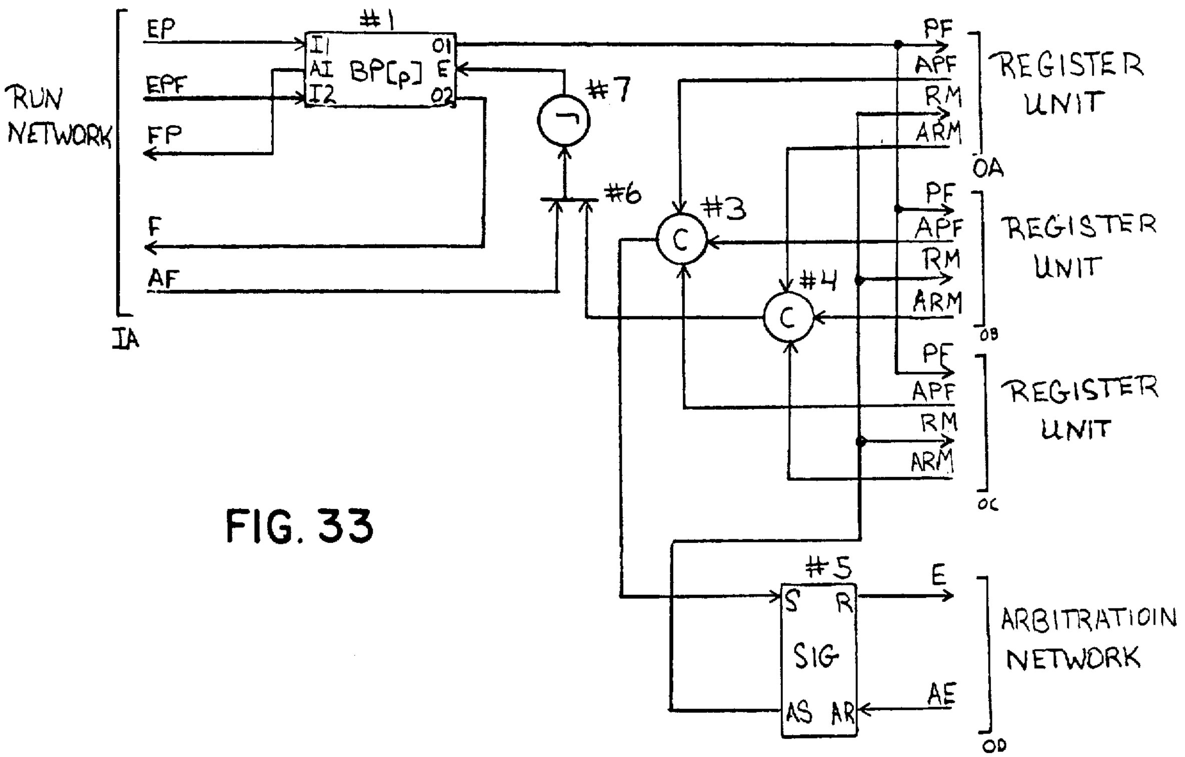
FIG. 33 is a schematic diagram for a Cell Control Unit.

Each Cell Control Unit (31 #14) coordinates the transfer of instruction packets from the three Register Units (31 #1, 31 #2, 31 #3) of its Cell to the Arbitration Network, and permits exactly as many packets to be transferred as are requested by the Controller through the Run Network (31 #9). The constuction of the Cell Control Unit is given in FIG. 33. Requests for cycles of program execution are accepted by EP/AP transactions at port IA, and are queued in pipeline module (33 #1). This queuing permits some Cells of the Memory to run ahead or behind other Cells so that more instructions are available for concurrent execution by the processor. The C-module (33 #3) causes a request (by enable signal on OD.E) for instruction packet acceptance to be made via (33 #5) when PF/APF signals at ports OA, OB, OC indicate all Register Units are filled. When the Arbitration Network has accepted the packet and the OD.E/AE transaction is completed, RM/ARM signals at ports OA, OB, OC delay re-enabling of pipeline (33 #1) via (33 #4, 33 #6, 33 #7) until the initially filled variable mode Register Units are filled again by arrival of result packets.

An EPF/AP transaction at port IA indicates the end of execution cycle requests for the run command being performed and enters an end indicator in pipeline (33 #1). When this indicator appears at output O2 of the pipeline (33 #1), all requested execution cycles are completed, and this fact is signalled to the Controller through the Run Network by an IA.F/AF transaction.

6.2. Functional Units

Figure 34:
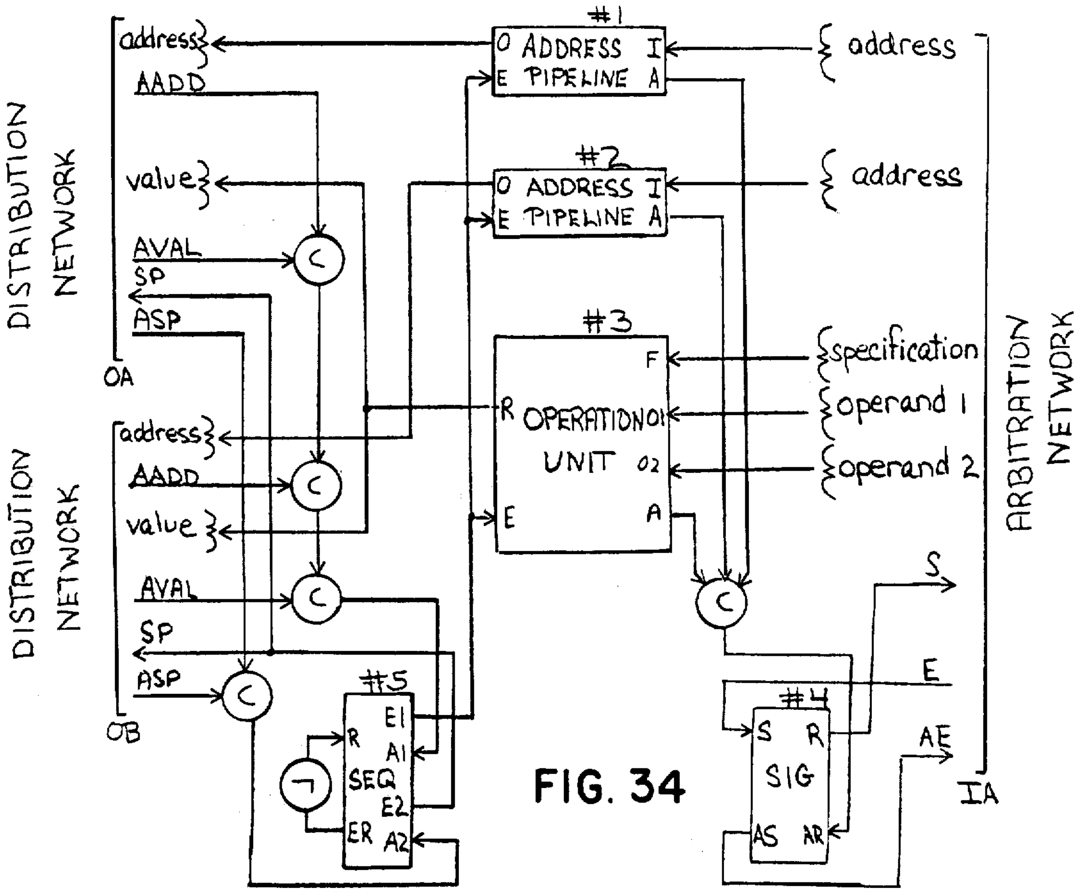
FIG. 34 is a schematic diagram for a Functional Unit.

Each Functional Unit has the structure shown in FIG. 34. Instruction packets enter through port IA in parallel format, and consist of two addresses, a specification and two values. The Operation Unit (34 3), which might be a pipeline multiplier, for example, receives the two values which are used as operands, and the specification, which indicates a specialization of the operation to be performed. The two addresses are entered into two Address Pipeline Units (34 #1, 34 #2). Results of operations and their associated addresses are formed into two result packets and sent separately to the Distribution Network through ports OA and OB.

Modules (34 #4, 34 #5) implement the signalling discipline required of type A (port IA) and type B (ports OA and OB) links.

6.3. Arbitration Network

Figure 35:
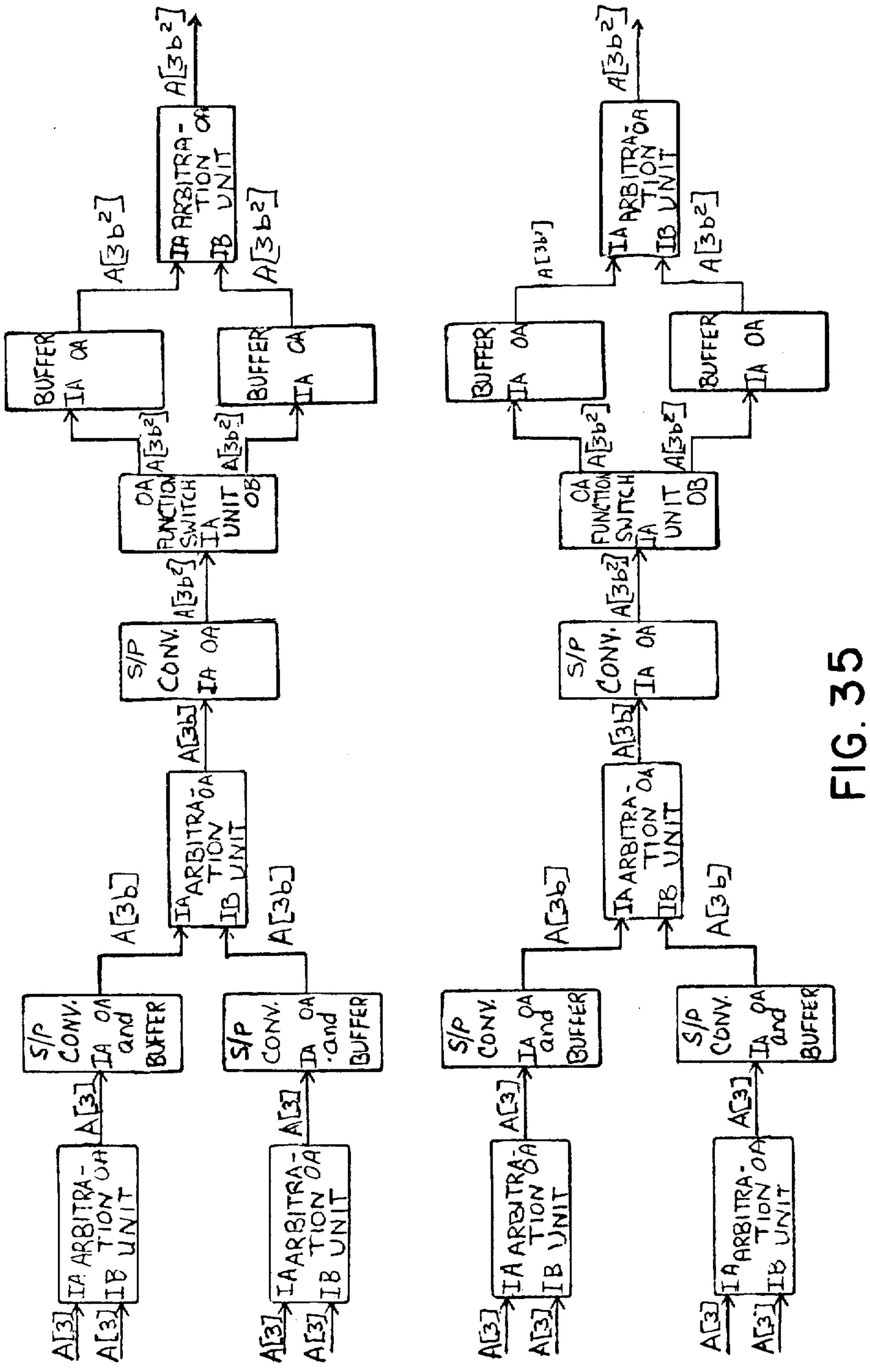
FIG. 35 is a block diagram of the Arbitration Network organization.

The Arbitration Network provides transmission paths for instruction packets from each Cell of the Memory to each Functional Unit. One possible structure for the Arbitration Network is shown in FIG. 35. This structure uses four kinds of units:

a. Arbitration Units
b. Serial-to-Parallel Converter Units
c. Buffer Units
d. Function Switch Units An Arbitration unit accepts instruction packets through several input ports on a first-come, first-served basis and delivers them at a common output port. Sufficient Arbitration Units are required to provide a path from each Cell to each Functional Unit. An S/P Converter Unit transforms each arriving instruction packet into a more parallel format. The conversion from serial to parallel format may be done in several stages, as indicated in FIG. 35. Buffer Units store complete instruction packets in readiness for quick transmission through a following Arbitration Unit. Buffer Units are required to prevent an instruction packet from engaging an Arbitration Unit before serial/parallel conversion is complete, resulting in an unnecessarily long busy interval for the Arbitration Unit. Function Switch Units direct instruction packets to one of several output ports according to function bits of the instruction.

The Arbitration Units provide the fan-in whereby each Functional Unit may receive an instruction packet from any Cell. The Function Switch Units provide the fan-out whereby each Cell may send an instruction packet to any Functional Unit. For simplicity in the present description a fan-in and fan-out of two is assumed. Generalization of the designs is straightforward.

All connections to units of the Arbitration Network are type A links having the number of data pairs indicated in FIG. 35. We suppose that each S/P Converter multiplies the number of parallel data paths by b. Thus input links to the Arbitration Network are type A[3]; the input links to the second rank of Arbitration Units are type A[3*b*]; and the input links to the third rank of Arbitration Units are type A[$3b^2$].

6.3.1. Arbitration Unit

Figure 36:
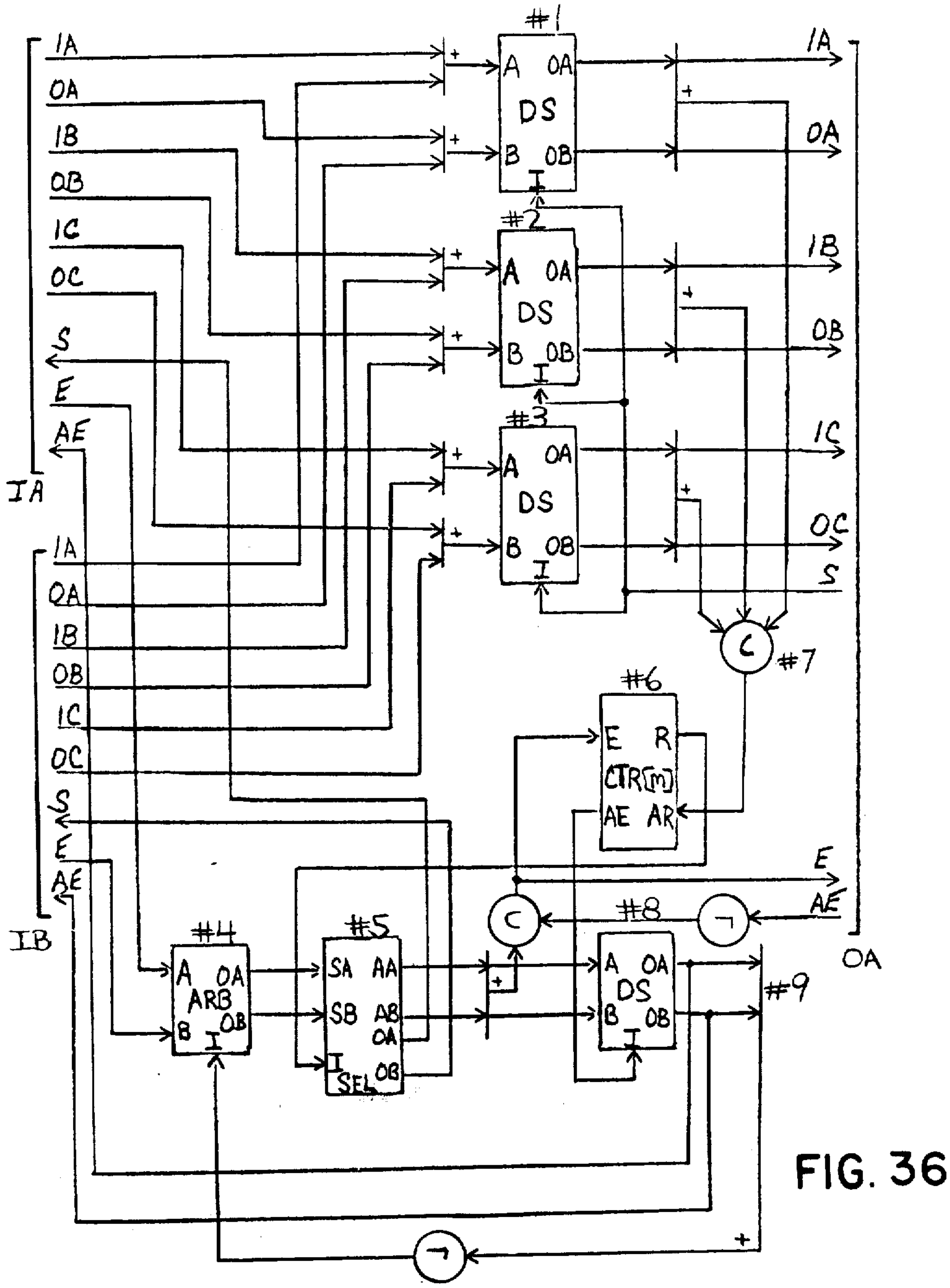
FIG. 36 is a schematic diagram for an Arbitration Unit.

A typical Arbitration Unit is shown in FIG. 36. This design is for the first rank of Arbitration Units in FIG. 35. The versions required for the second and third ranks are obtained merely by increasing the number of data switch modules (36 # 1, 36 # , 36 # 3) to accommodate the larger number of data wires and changing the modulus of counter (36 # 6).

A signal on IA.E or IB.3 indicates that an instruction packet is availale at one of the input ports. The arbiter module (36 # 4) gives priority to the first enable signal to reach it, and sets module (36 #5) accordingly. Once (36 #5) is set counter (36 # 6) is enabled to perform m cycles of data transmission, and an enable signal is sent out on OA.E.

Each data transmission cycle is started by an enable signal from counter (36 # 6) sent over wire S of the input port selected by (36 # 5). When an enable signal is received over one wire of each data pair, C-module (36 #7) sends an acknowledgement signal to the counter (36 # 6). The signal path just traced must reset before a new transmission cycle may begin. When the count is complete, the acknowledge signal from (36 # 6) is directed to wire AE of the appropriate input port by data switch (36 # 8), and the arbiter (36 # 4) is re-enabled through (36 # 9).

6.3.2. Serial/Parallel Converter and Buffer

Figure 37:
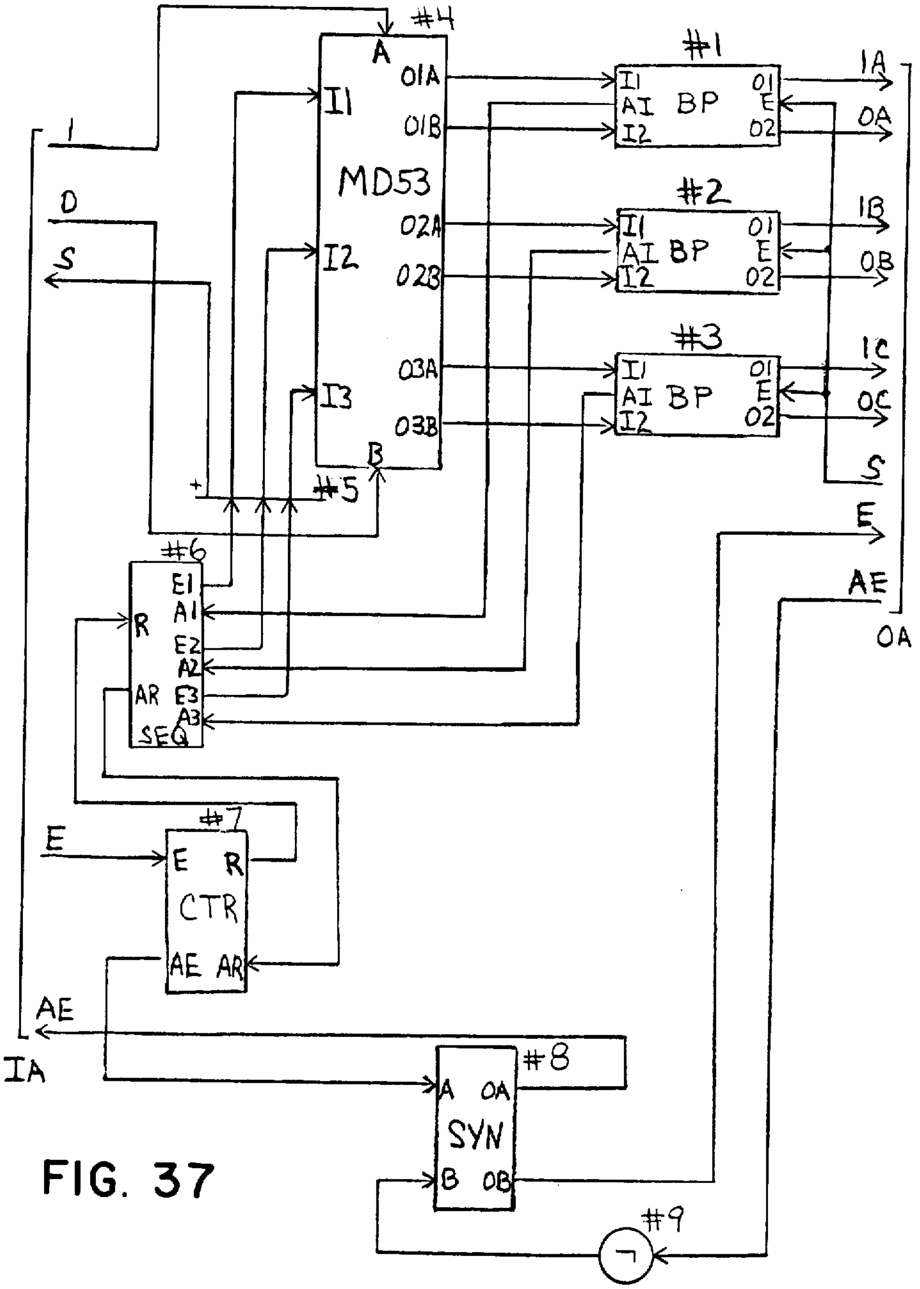
FIG. 37 is a schematic diagram for a Serial-to-Parallel Conversion and Buffer Unit.

The functions of serial-to-parallel conversion and buffer storage are conveniently combined in one unit as shown in FIG. 37. This unit has a type A[1] input link and a type A[3] output link. The generalization to the forms required in FIG. 35 is easy.

Dada arriving on wires IA.1 and IA.0 are passed to the pipeline modules (37 # 1, 37 # 2, 37 # 3) through a multiple data switch (37 # 4). The sequence module (37 #6) controls distribution of successive bits cyclically to the three pipeline modules. The action of filling the pipeline modules is started by a signal on IA.E which enables counter (37 # 7). When each pipeline is filled with w bits the counter acknowledges, yielding through (37 #8) an enable signal on OA.E and an acknowledge signal on IA.AE. The pipeline buffer may then be emptied by w enable signals on OA.S.

6.3.3. Function Switch Unit

Figure 38:
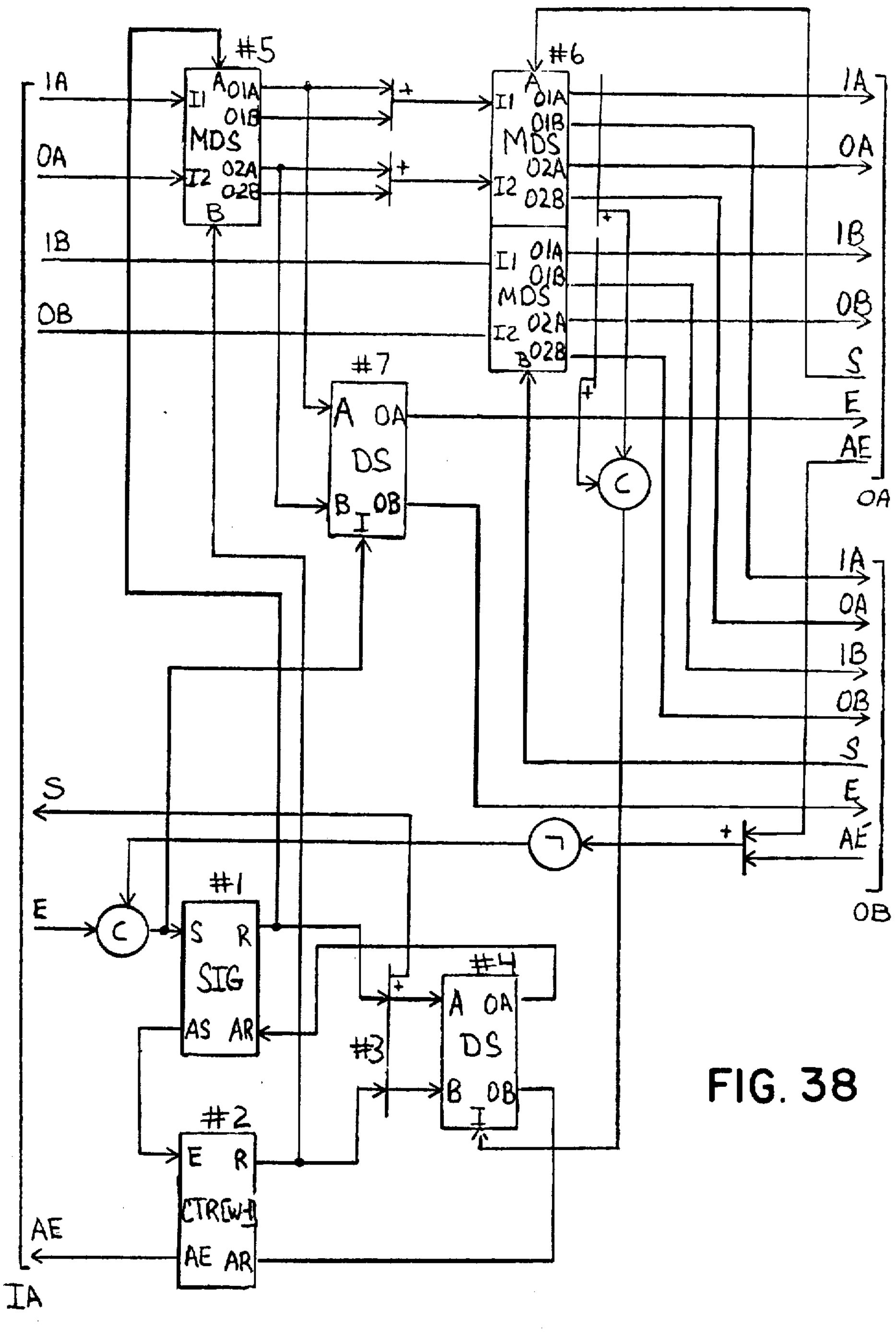
FIG. 38 is a schematic diagram for a Function Select Unit.

A typical Function Switch Unit is shown in FIG. 38. For illustration, the instruction packet arriving at port IA is assumed to have w bytes of 2 bits each. The Function Switch Unit uses bit A of the first byte to direct the packet to port OA or OB.

Modules (38 # 1, 38 # 2, 38 # 3, 38 # 4) make up a w-state counter whose first state is distinguished by an enable signal on output R of (38 # 1) rather than on output R of (38 # 3). Hence, when enabled by a signal on IA.E, the data switch (3 #4) causes bit A of the first byte received to be stored in data switch (38 # 7). An enable signal is sent on OA.E or OB.E to request that the entire packet be sent out port OA or OB through multiple data switch (38 # 6) by a sequence of w enable signals on OA.S or OB.S. An acknowledge signal occurs on IA.AE when packet transmision is complete and counter (38 # 2) acknowledges.

6.4. Distribution Network

Figure 39:
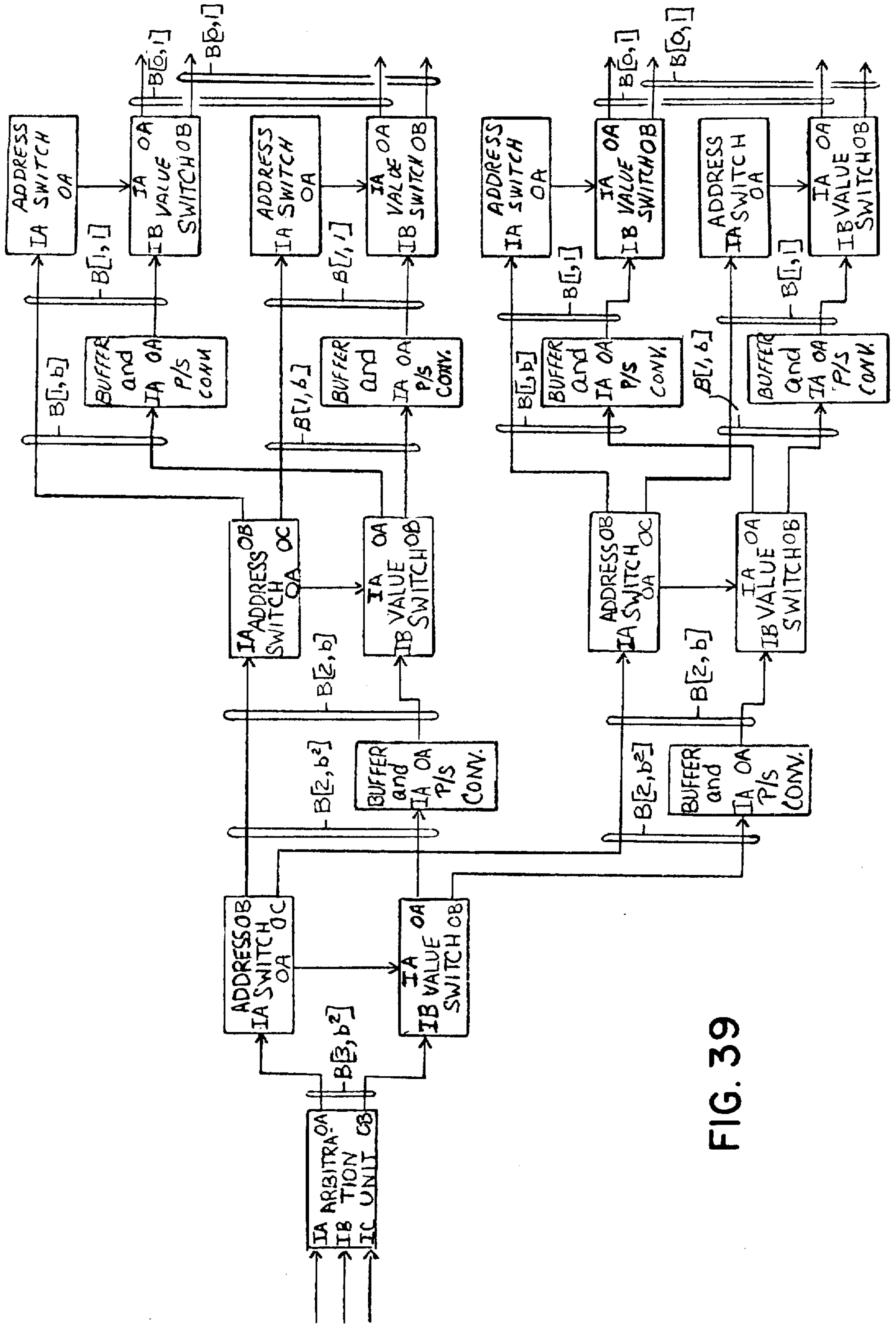
FIG. 39 is a block diagram of the Distribution Network Organization.

The Distribution Network provides transmission paths for result packets from each Functional Unit and the Controller to each Register Unit of the Memory. One possible structure for the Distribution Network is shown in FIG. 39. There are five kinds of units:

a. Arbitration Units
b. Address Switch Units
c. Value Switch Units
d. Parallel-to-Serial Conversion Units
e. Buffer Units A few Arbitration Units are required because result packets from several Functional Units may compete for access to the Distribution Network. Each Address Switch Unit, in conjunction with an associated Value Switch Unit, directs result packets over one of two paths in the Distribution Network according to the most significant remaining bit in the address part of the packets. The address bit tested by the Address Switch is deleted from the packet. The Parallel/Serial Conversion Units and Buffer Units handle only the value part of the result packet since there is insufficient advantage to serializing the address part. The purpose of the Buffer Unit is to avoid causing the preceeding Value Switch Unit to wait for the parallel/serial conversion to complete before passing other result packets.

The links shown in FIG. 39, except for the links connecting Address Switch Units to Value Switch Units, combine in pairs to form type B links as indicated in the figure. For simplicity, the Distribution Network shown accepts result packets having three-bit addresses.

6.4.1. Address Switch Unit

Figure 40:
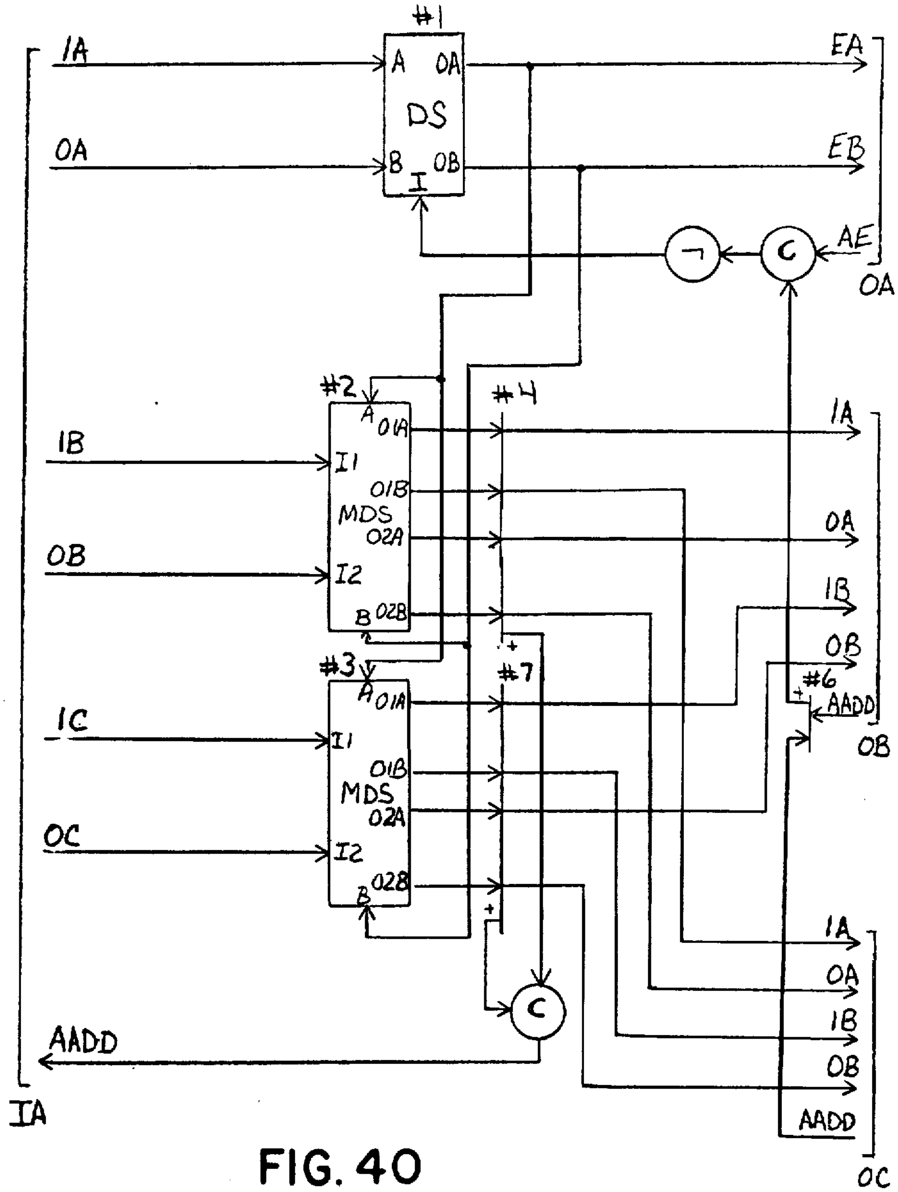
FIG. 40 is a schematic diagram for an Address Switch Unit.

The structure of a typical Address Switch Unit is shown in FIG. 40. The most significant address bit of the result packet is received on wires IA.1A, IA.0A and is held in data switch (40 # 1). The output signal from (40 # 1) initiates an OA.EA/AE or an OA.EB/AE transaction with the associated Value Switch Unit, and sends [by modules (40 # 2, 4 # 3)] the remaining address bits through port OB or OC to the next rank of Address Switch Units.

6.4.2. Value Switch Unit

Figure 41:
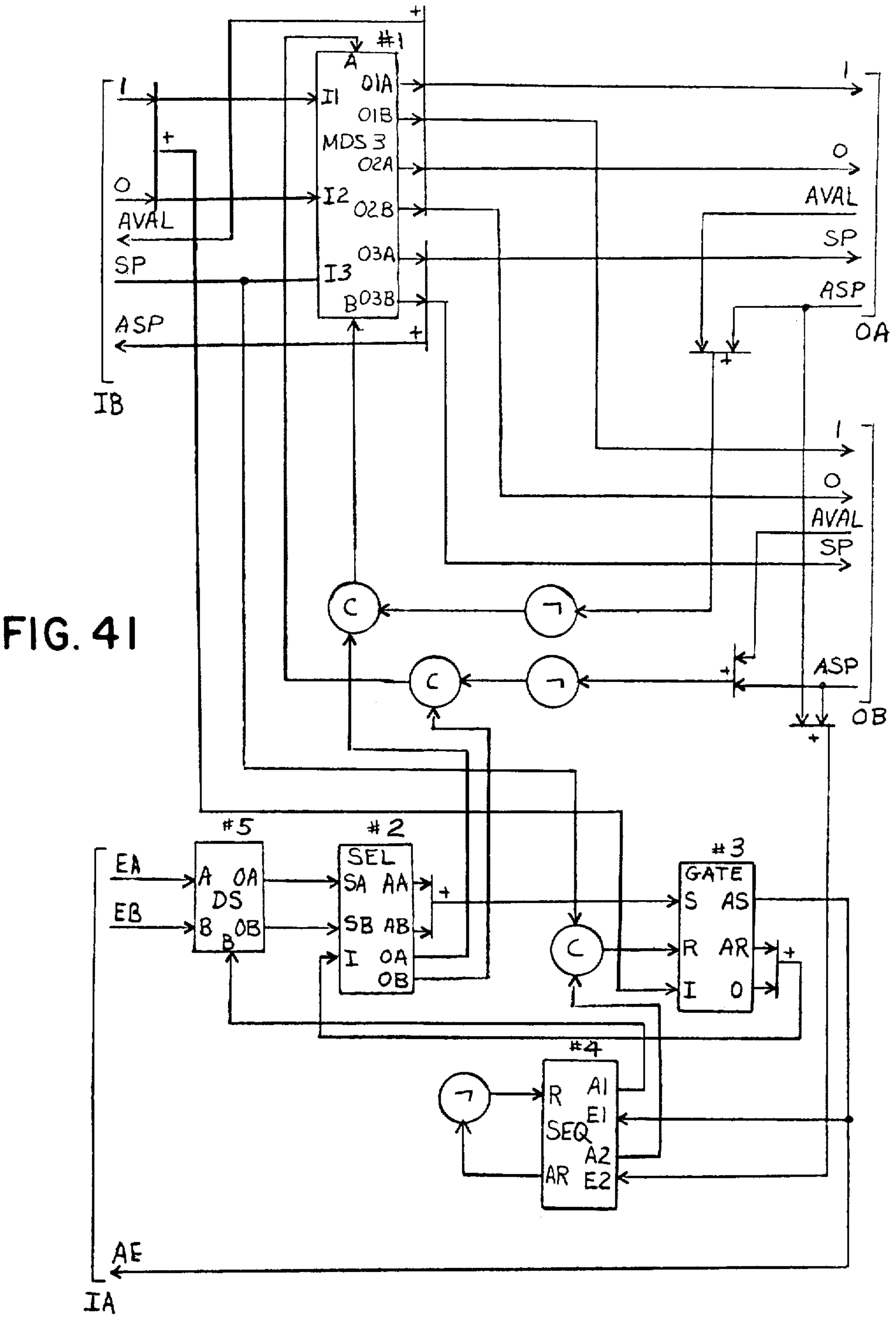
FIG. 41 is a schematic diagram for a Value Switch Unit.

The structure of a typical Value Switch Unit is shown in FIG. 41. The Value Switch is enabled for transmitting a value from port IB to port OA or OB by an enable signal arriving on IA.EA or LA.EB from the associated Address Switch Unit. This enable signal sets the select module (41 # 2) to indicate the output port to be used, and then sets the gate module (41 # 3) which permits passage of value bits through multiple data switch (41 # 1). Sequence module (41 # 4), which starts operation with a signal at output E1, permits a signal on E2 only after the data switch (41 # 5) has reset. Then a space signal on IB.SP resets gate module (41 # 3), blocking further data transmission, and the space signal is transmitted by an OA.SP/ASP or an OB.SP/ASP transaction. When this transaction is complete, sequence module (41 # 4) returns to its initial condition.

6.4.3. Buffer and P/S Conversion Unit

Figure 42:
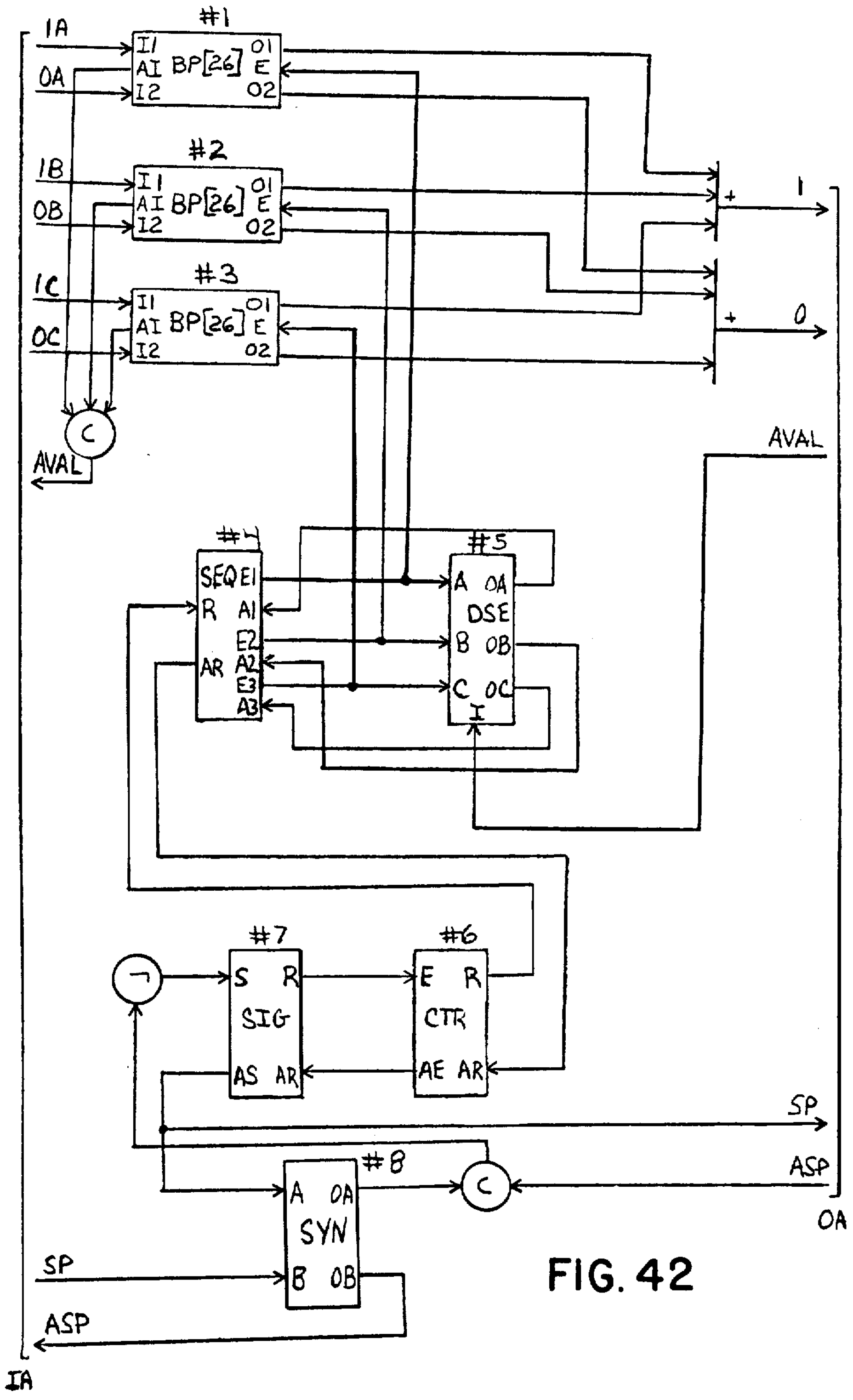
FIG. 42 is a schematic diagram for a Buffer and Parallel-to-Serial Conversion Unit.

The Buffer and Parallel/Serial Conversion Unit (FIG. 42) uses the same principle of operation as the Parallel/Serial Conversion and Buffer Unit (FIG. 37). The buffer storage is provided by three pipeline modules (42 #1, 42 #2, 42 #3) which are filled by b transactions on port IA. Sequence module (42 #4) and data switch (42 # 5) control the transmission of bits through port OA from the three pipeline modules cyclically. Counter (42 #6) and module (42 #7) generate the space signal on OA.SP when all bits of a result packet have been transmitted and the counter has reset. The synchronizer (42 # 8) ensures that an SP/ASP transaction is completed on port IA before a new pocket is transmitted.

6.5. Controller

The Controller accepts commands from the Host, which may be a supervisory computer or an operator console. The four types of commands are the following:

enter-constant (*a*, *v*)
enter-variable )*a*, *v*)
empty (*a*, —)
run (—, *v*)

The two types of enter commands cause the value *v* to be entered in the Register Unit with address *a*. An empty command causes the Register Unit with address *a* to be emptied. A run command is a request that the program represented in the Memory be run for *v* execution cycles, so that each instruction is executed *v* times.

Figure 43:
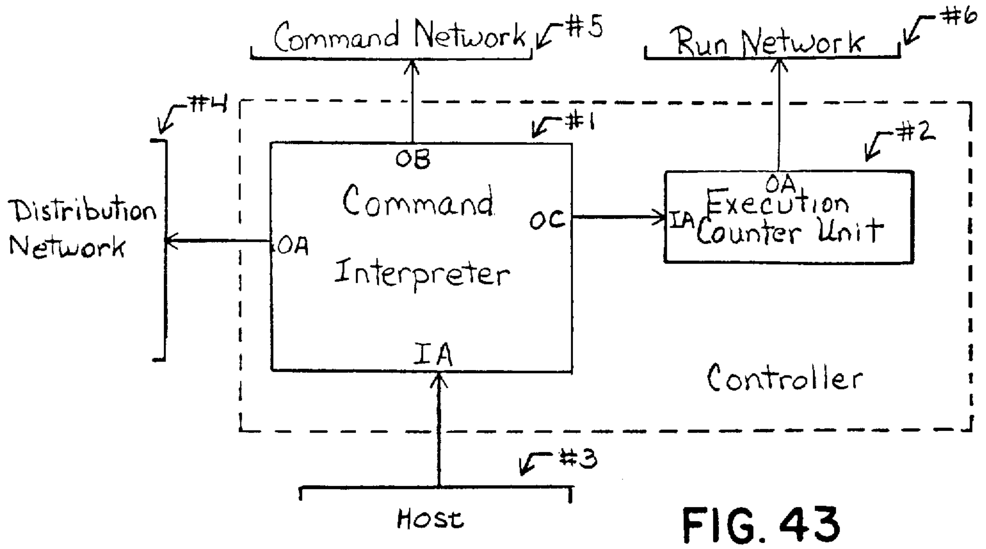
FIG. 43 is a block diagram of the links and structure of the Controller.

The structure of the Controller is shown in FIG. 43. The Command Interpreter Unit (43 # 1) accepts commands from the Host (43 # 3), transmits result packets though the Distribution Network (43 # 4) for enter commands, requests Register Units to fill or empty themselves through the Command Network (43 # 5), and delivers run commands to the Execution Counter Unit (43 #2). The Execution Counter Unit transmits the specified number of execution cycle request signals to the Cells of the Memory through the Run Network (43 #6).

6.5.1. Command Interpreter Unit

Figure 44:
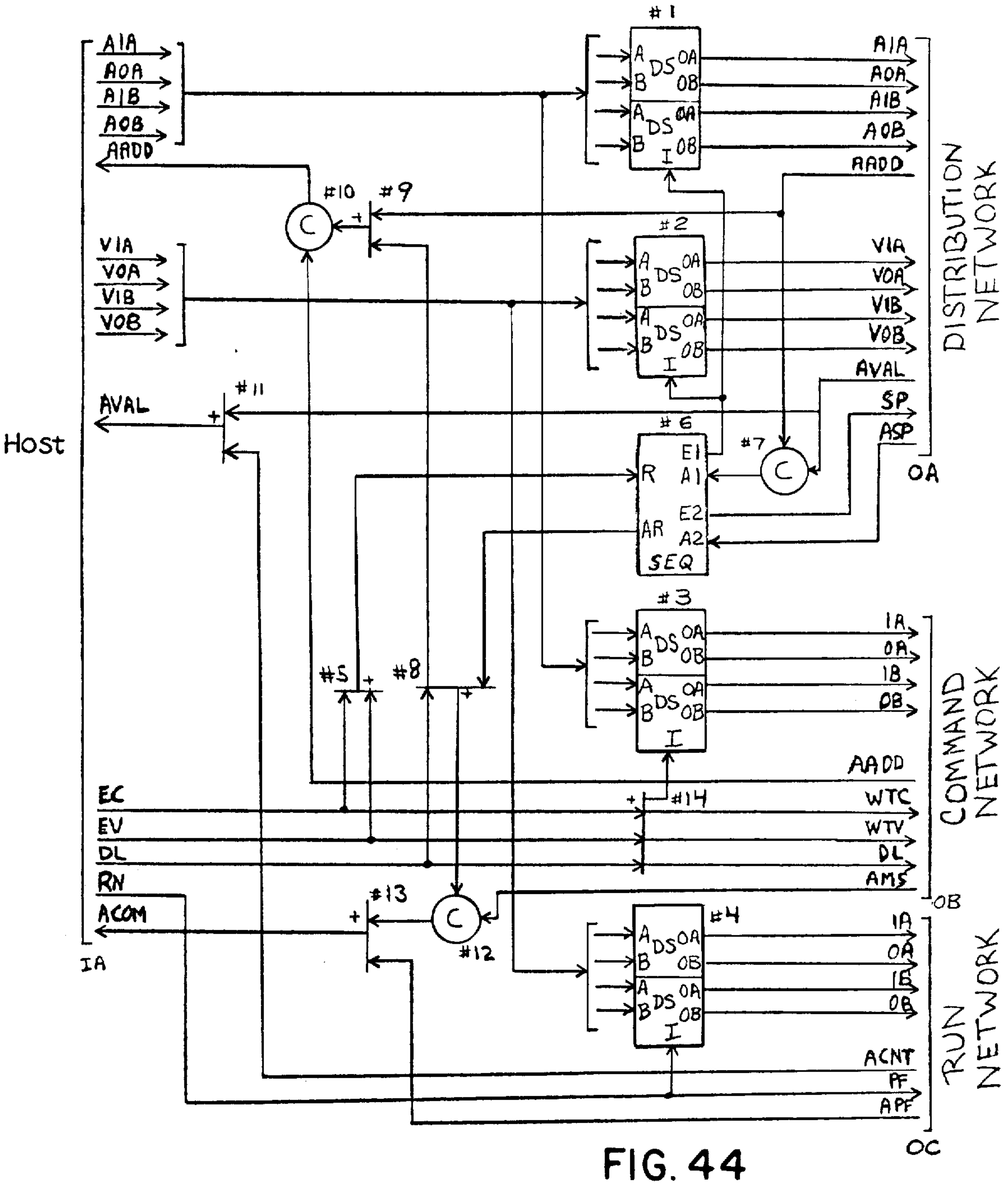
FIG. 44 is a schematic diagram for a Command Interpreter Unit.

The structure of the Command Interpreter Unit is shown in FIG. 44. However, addresses and values are illustrated as 2-bit values for simplicity. The generalization to q-bit addresses and m-bit values is straightforward. The commands enter-constant, enter-variable, empty and run are performed in response to enable signals on wires IA.EC, IA.EV, IA,DL and IA.RN, respectively. An acknowledge signal occurs on IA.ACOM when execution of the command is completed. Addresses are presented to the Controller on wires IA.A1A through IA.AϕB and acknowledged on IA.AADD for enter and empty commands. Values are presented on wires IA.V1A through IA.VϕB and acknowledged on IA.AVAL, for enter and run commands.

For an enter-constant or enter-variable command, a result packet is presented to the Distribution Network (port OA) through a type B[2,2] link. The result packet is formed by data switch modules (44 #1, 44 #2) controlled by modules (44 # 5, 44 #6, 44 # 7). The sequence module (44 #6) performs a transaction OA.SP/OA.ASP after the result packet is acknowledged and the packet wires are reset, as required for type B links. At the same time the address is sent to the Command Network (port OB) through a type C[2] link, and one of the transactions OB.WTC/AMS or OB.WTV/AMS is performed [Modules (44 #14, 44 #3)]. This action directs the specified Register Unit to await delivery of a value from the Distribution Network and return an acknowledge signal when the value is completely received.

An empty command is executed by sending the address to the Command Network (port OB) and performing and OB.DL/AMS transaction. [Modules (44 #14, 44 #3)]. This directs the specified Register Unit to empty its pipeline module.

A run command is executed by sending the value to the Execution Counter (port OC) and performing an OC.PF/APF transaction [Module (44 # 4)]

Modules (44 #9, 4 #10) handle acknowledgement of addresses and permit the address wires to be reset as soon as the address has been absorbed by the Distribution Network or Command Network. Module (44 #11) provides the same function for values. Modules (44 # 8, 44 #12, 44 #13) generate the command acknowledge signal on IA.ACOM when command execution is complete.

6.5.2. Execution Counter Unit

Figure 45:
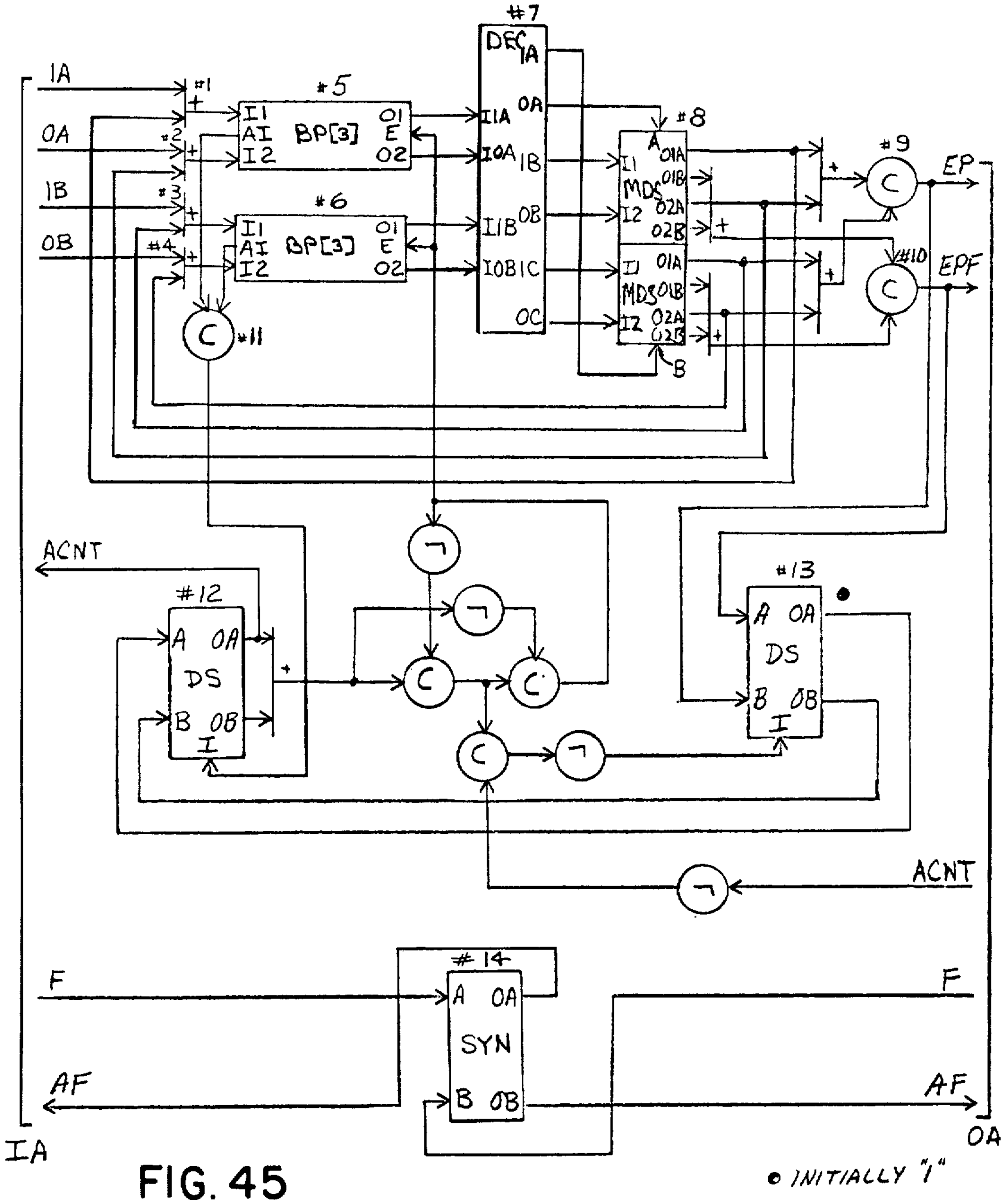
FIG. 45 is a schematic diagram of an Execution Counter Unit.

The Execution Counter Unit is shown in FIG. 45. Again values are assumed to have 2 bits for simplicity. The value supplied at port IA by a run command is entered in the two bit pipelines (45 # 5, 45 # 6). The decrement module (45 # 7) has the property that the three-bit values represented on output pairs A, B, C is always one less than the two-bit value on input pairs A, B. Output pair A of (45 # 7) represents 1 if a borrow is required to form the decrement. If no borrow is required, the decremented value is reentered into the pipelines through modules (45 #8, 45 #1, 45 #2, 45 #3, 45 #4). When a borrow is required, the value is discarded and the pipelines are left empty to receive the next run command. This action is controlled by data switch modules (45 #12, 45 #13) and the associated C and NOT modules. Output OA of (45 #13) is initially 1 and returns to one at completion of each run command. Thus entering the presented value into the pipelines (45 #5, 45 #6) produces an acknowledge signal at IA.ACNT. For each decrement cycle, an OA.EP/AP transaction requests one cycle of program execution through the Run Network (port OA). When a borrow is required, an OA.EPF/AP transaction is sent through the Run Network to direct all Memory Cells to acknowledge when all requested execution cycles are complete. This acknowledgement leads to an OA.F/AF transaction, which, by module (45 #14), permits completion of command execution by an IA.PE/APF transaction.

6.6. Command Network

Figure 46:
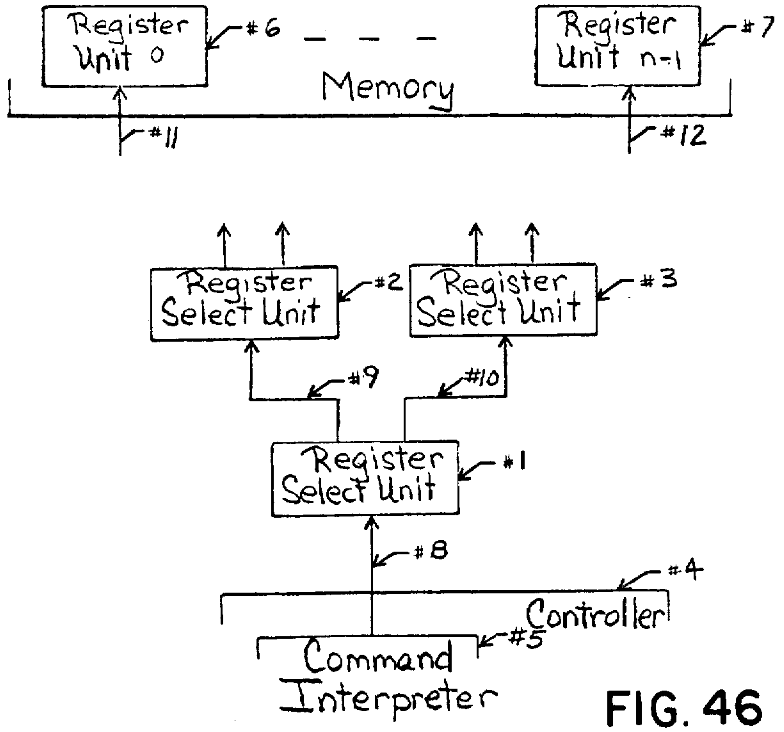
FIG. 46 is a block diagram of the structure of the Command Network.

The Command Network (FIG. 46) is a tree of Register Select Units (46 #1, 46 #2, 46 #3) that direct command transactions from the Controller (46 # 4) to the Register Unit (46 #6, 46 #7) specified by a q-bit address. For simplicity in this description, we suppose that one address bit is decoded at each level of the tree. Thus the link (46 # 8) connecting the Command Interpreter (46 # 5) of the Controller to the first Register Select Unit (46 # 1) is a type C[*q*] link and includes a pair of enable wires for each of the *q* address bits. The links (46 # 9, 46 #10) connecting the first Register Select Unit to the second level units (46 #2, 46 #3) are of type C[q-1], and the links (46 #11, 46 #12) connecting to Register Units are of type C[ϕ].

Figure 47:
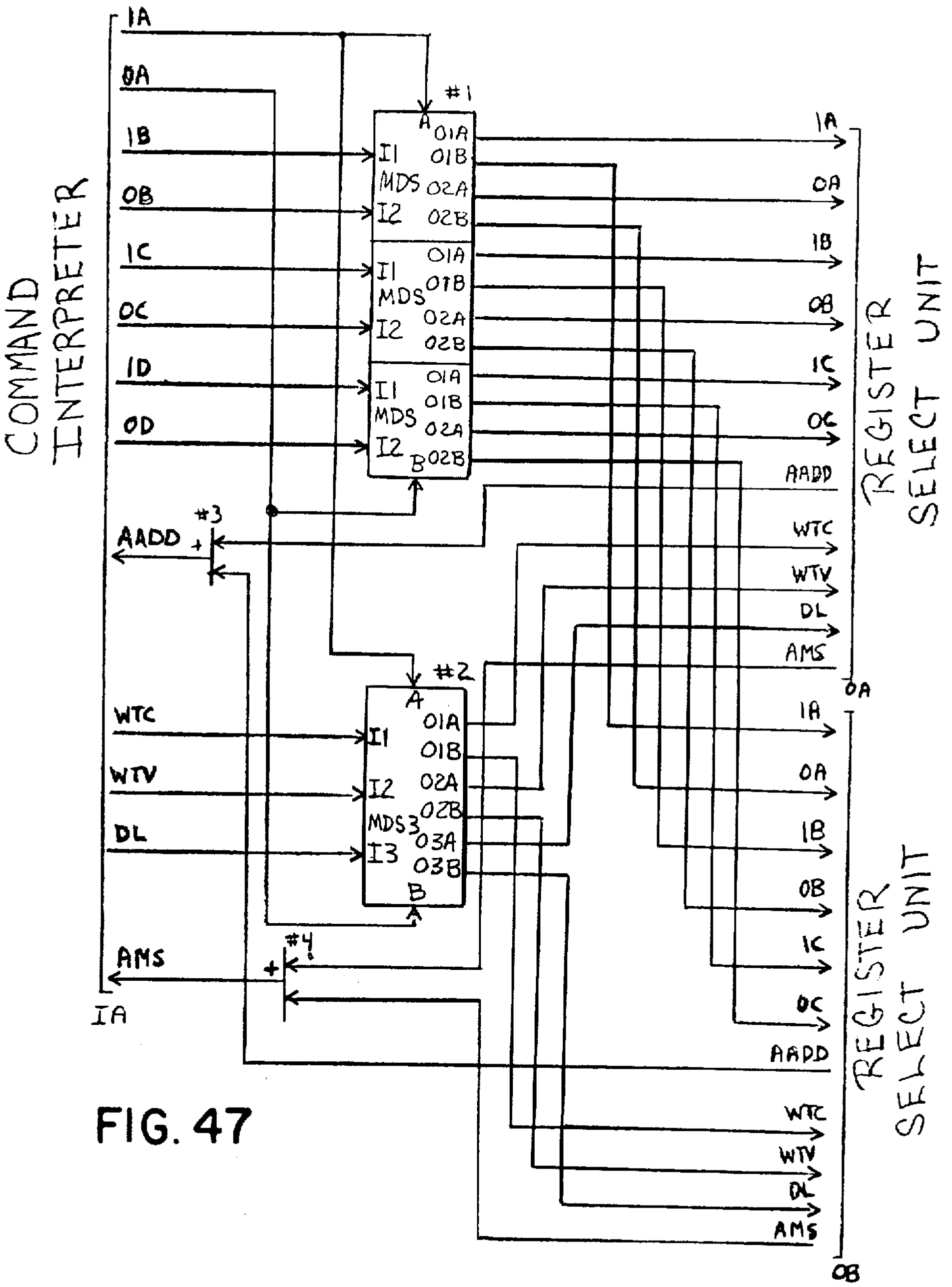
FIG. 47 is a schematic diagram for a Register Select Unit.

FIG. 47 shows the structure of a typical Register Select Unit having a type C[4] input link and two type C[3] output links. Multiple data switch modules (47 # 1, 47 # 2) direct address and command signals to port OA or OB according to the most significant address bit Acknowledge signals are returned through modules (47 # 3, 47 # 4).

6.7. Run Network

Figure 48:
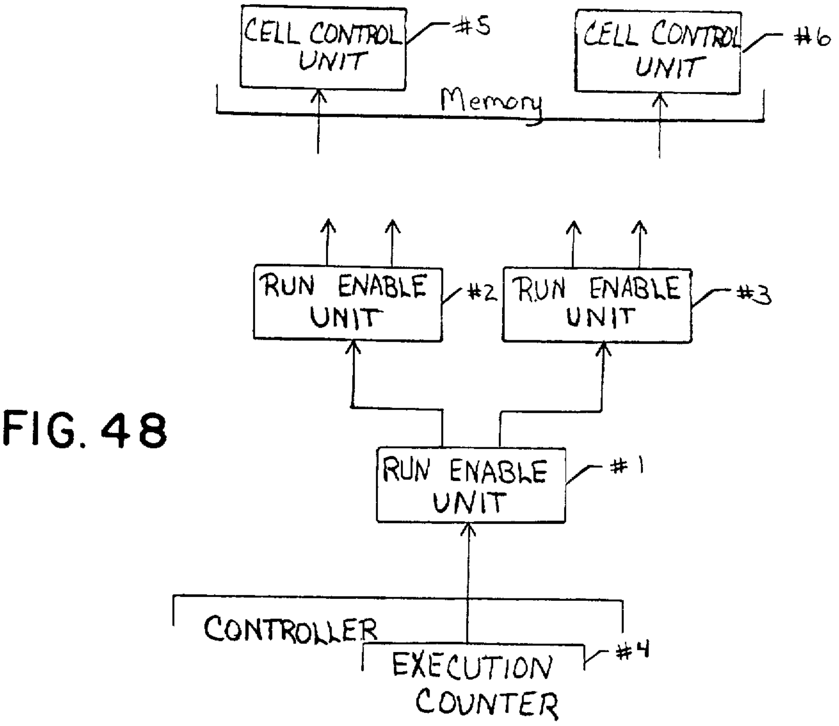
FIG. 48 is a block diagram of the structure of the Run Network.
Figure 49:
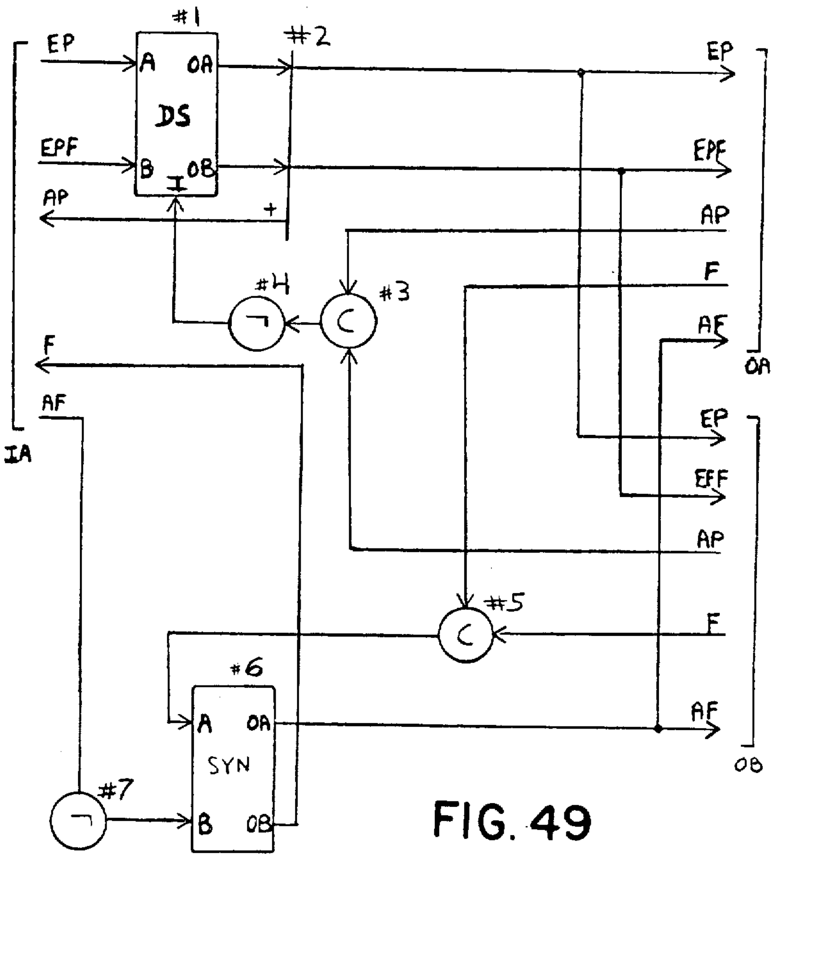
FIG. 49 is a schematic diagram for a Run Enable Unit.

The Run Network (FIG. 48) is a tree of Run Enable Units (4 # 1, 48 # 2, 48 # 3) that communicate request and completion transactions between the Execution Counter Unit (48 # 4) of the Controller and Cell Control Units (48 # 5, 48 # 6) of the Memory. All links shown in FIG. 48 are type D. The structure of the Run Enable Units is shown in FIG. 49. Modules (49 # 1, 49 # 2, 49 # 3, 49 # 4) forward request signals and provide immediate acknowledgement so many request transactions may propagate through the Run Network at once. Modules (49 # 5, 49 # 6, 49 # 7) perform the same function for completion signals.

What is claimed is:

1. A data processing apparatus for highly parallel execution of stored programs, comprising:

memory means for holding instructions of a data processing program and data items for processing under direction by said program, said memory means comprising a plurality of cells, each cell comprising plural registers, each register comprising means for holding an instruction or a data item, each register of said memory means having a unique address, and each instruction comprising an operation code specifying a computational operation and zero or more addresses;

functional means including at least one functional unit for performing computational operations on data items.

arbitration means for transmitting instruction packets from any cell of said memory means to functional units, an instruction packet comprising an instruction and at least one data item, said arbitration means delivering the data item parts of each instruction packet and the plural address parts of each instruction packet to functional units capable of performing the computational operation specified by the operation part of said instruction packet; said arbitration means beng capable of transmitting a plurality of instruction packets at the same time;

distribution means for transmitting result pockets from said functional units to registers of said cells, a result packet comprising a data item and an address, said distribution means delivering the data item part of each result packet to the register specified by the address part of the result packet, said distribution means being capable of transmitting a plurality of result packets at the same time;

said functional means further comprising: means for separating the data items and address parts of instruction packets received from said arbitration means; means for performing a computational operation on the data items to produce a new data item; means for holding addresses during the performance of computational operations on the associated data items; means for combining a data item and one or more addresses into one or more result packets for transmission through said distribution means;

each register of each cell indicating whether it contains an instruction or data item and whether it is full or empty; and each register accepting a data item delivered to it by said distribution means as said register becomes empty, each register further indicating that it is full when an instruction or data item has been transferred into said register, each cell presenting to said arbitration means an instruction and data items held in its registers just as all registers of said cell are full; each register contributing its contents as part of an instruction packet transmitted to said arbitration means while retaining the instruction or data item and maintaining a full indication or otherwise becoming empty and changing to an empty indication; and means for setting up instruction and initial data items in said memory means, for controlling the number of cycles of program execution, and for altering stored instructions and data items at intermediate points during program execution.

2. A data processing apparatus for highly parallel execution of stored programs, comprising:

memory means for holding instructions of a data processing program and data items for processing under direction of said program, said memory means comprising a plurality of memory sections of like construction, each memory section being capable of holding plural instructions, each instruction including information comprising an operation part specifying either a computational operation and zero or more addresses;

functional means including at least one functional unit for performing computational operations on data items;

arbitration means for transmitting instruction packets from said memory means to the functional units, an instruction packet comprising an instruction and at least one data item, said arbitration means delivering each instruction packet to a functional unit capable of performing the computational operation specified by the operation part of the instruction part of the instruction packet;

distribution means for transmitting result packets from said functional units to said memory means, a result packet comprising a data item and an address, an address specifying the memory section to which the data item part of the result packet is to be sent, said distribution means delivering each result packet to the memory section specified by its address part;

control means for setting up instruction and initial data items in said memory means and controlling the progress of program executions, such that each instruction packet enters said arbitration means entirely before any part of said instruction packet leaves said arbitration means, such that said memory means has no direct influence on the passage of said instruction packet through said arbitration means, such that each result packet enters said distribution means entirely before any part of said result packet leaves said distribution means, such that said memory means has no direct influence on the passage of the result packet through said distribution means, and such that said functional means performs the computational action specified by the data processing program held in said memory means.

3. A data processing apparatus for highly parallel execution of stored programs, comprising:

memory means for holding instructions of a data processing program and data items for processing under direction by said program, said memory means comprising a plurality of cells, each cell comprising plural registers, each register comprising means for holding an instruction or data item;

instruction execution means for performing computational actions specified by the instructions of a data processing program;

first transmission means for transmitting instruction packets from any cell of said memory means to said instruction execution means, an instruction packet comprising an instruction and one or more data items;

second transmission means for transmitting data items from said instruction execution means to a specified register of any cell of said memory means; each register of each cell in said memory means indicating whether it contains an instruction or data item, and whether it is full or empty; each register further indicating that it is full when an instruction or data item has been transferred into said register; each cell presenting to said instruction execution section means an instruction packet comprising the instruction and data items held in the registers of said cell just as all registers of said cell indicate full; each register contributing its contents as part of an instruction packet while retaining the instruction or data item and maintaining a full indication and otherwise becoming empty and changing to an empty indication.

4. A data processing apparatus for highly parallel execution of stored programs, said apparatus comprising:

a. memory means including a plurality of cell means, each of said cell means including a plurality of register means for holding first packets representing information, each one of said first packets containing at least one of a plurality of instruction representations designating an operation and at least one of a plurality of data representations designating an operand, each of said plurality of register means having a unique address;

b. arbitration means for determining and transmitting second packets representing information, each one of said second packets containing at least one of a plurality of portions of instruction representations corresponding to that of said one of said first packets and at least one of a plurality of data representations corresponding to that of said one of said first packets;

c. functional means including at least one operational means for determining and transmitting third packets representing information, each one of said third packets containing at least one of a plurality of portions of instruction representations corresponding to that of said one of said second packets and at least one of a plurality of data representations generated by operation of at least one of said operational means on at least one of a plurality of data representations corresponding to that of said one of said second packets; and d. distribution means for determining and transmitting fourth packets representing information each one of said fourth packets containing at least one of a plurality of portions of instruction representations corresponding to that of said one of said third packets and at least one of a plurality of data representations corresponding to that of said one of said third packets, certain of said plurality of cell means thereby receiving fifth packets representing information, each one of said fifth packets containing at least one of a plurality of portions of instruction representations corresponding to that of said one of said fourth packets and at least one of a plurality of data representations corresponding to that of said one of said fourth packets.

5. The data processing apparatus of claim 4 wherein one of said register means contains instruction representations and a plurality of said register means contains data representations designating a plurality of operands.

6. The data processing apparatus of claim 4 wherein said apparatus is synchronous.

7. The data processing apparatus of claim 4 wherein said apparatus is asynchronous.

8. The data processing apparatus of claim 4 wherein said arbitration means transmits a plurality of said second packets at one time.

9. The data processing apparatus of claim 4 wherein said distribution means transmits a plurality of said fourth packets at one time.

10. The data processing apparatus of claim 4 wherein each of said register means indicates whether it contains an instruction representation or a data representation.

11. The data processing apparatus of claim 4 wherein each of said register means indicates whether it is full or empty.

12. The data processing apparatus of claim 4 wherein said arbitration means transmits a plurality of said second packets at one time, said distribution means transmits a plurality of said fourth packets at the same time, each of said register means indicates whether it contains an instruction representation or a data representation, and each of said register means indicates whether it is full or empty.

13. A data processing apparatus for highly parallel execution of stored programs, said apparatus comprising:

a. memory means including a plurality of cell means, each of said cell means including a plurality of register means for holding first packets representing information, each one of said first packets containing at least one of a plurality of instruction representations designating an operation and at least one of a plurality of data representations designating an operand, each of said plurality of register means having a unique address;

b. arbitration means for determining and transmitting second packets representing information, each one of said second packets containing at least one of a plurality of portions of instruction representations corresponding to that of said one of said first packets and at least one of a plurality of data representations corresponding to that of said one of said first packets;

c. functional means including at least one operational means for producing and transmitting third packets representing information, each one of said third packets containing at least one of a plurality of portions of instruction representations corresponding to that of said one of said second packets and at least one of a plurality of data representations generated by operation of at least one of said operational means on at least one of a plurality of data representations corresponding to that of said one of said second packets; and d. distribution means for determining and transmitting fourth packets representing information each one of said fourth packets containing at least one of a plurality of portions of instruction representations corresponding to that of said one of said third packets and at least one of a plurality of data representations corresponding to that of said one of said third packets, certain of said plurality of cell means thereby receiving fifth packets representing information, each one of said fifth packets containing at least one of a plurality of portions of instruction representations corresponding to that of said one of said fourth packets and at least one of a plurality of data representations corresponding to that of said one of said fourth packets;

e. certain of said first packets, said second packets, said third packets, said fourth packets and said fifth packets containing at least one destination index by which its destination in the means to which it is directed is determined.

14. A data processing apparatus for highly parallel execution of stored programs, said apparatus comprising:

a. memory means including a plurality of cell means, each of said cell means including a plurality of register means for holding first packets representing information, each one of said first packets containing at least one of a plurality of instruction representations designating an operation and at least one of a plurality of data representations designating an operand, each of said plurality of register means having a unique address;

b. arbitration means for determining and transmitting second packets representing information, each one of said second packets containing at least one of a plurality of portions of instruction representations corresponding to that of said one of said first packets and at least one of a plurality of data representations corresponding to that of said one of said first packets;

c. functional means including a plurality of operational means for producing and transmitting third packets representing information, each one of said third packets containing at least one of a plurality of portions of instruction representations corresponding to that of said one of said second packets and at least one of a plurality of data representations generated by operation of at least one of said operational means on at least one of a plurality of data representations corresponding to that of said one of said second packets; and d. distribution means for determining and transmitting fourth packets representing information each one of said fourth packets containing at least one of a plurality of portions of instruction representations corresponding to that of said one of said third packets and at least one of a plurality of data representations corresponding to that of said one of said third packets, said certain of said plurality of cell means thereby receiving fifth packets representing information, each one of said fifth packets containing at least one of a plurality of portions of instruction representations corresponding to that of said one of said fourth packets and at least one of a plurality of data representations corresponding to that of said one of said fourth packets;

e. certain of said first packets containing at least one functional specification, said functional specification designating the operational means to which it is directed through said arbitration means.

15. A data processing apparatus for highly parallel execution of stored programs, said apparatus comprising:

a. memory means including a plurality of cell means, each of said cell means including a plurality of register means for holding first packets representing information, at least one of said first packets containing an instruction representation designating an address and an operation and at least one of a plurality of data representations designating an operand, each of said plurality of register means having a unique address;

b. arbitration means for determining and transmitting second packets representing information, each one of said second packets containing at least one of a plurality of portions of instruction representations corresponding to that of said one of said first packets and at least one of a plurality of data representations corresponding to that of said one of said first packets;

c. functional means including at least one operational means for producing and transmitting third packets representing information, each one of said third packets containing at least one of a plurality of portions of instruction representations corresponding to that of said one of said second packets and at least one of a plurality of data representations including a result value generated by operation of at least one of said operational means on at least one of a plurality of data representations corresponding to that of said one of said second packets; and d. distribution means for determining and transmitting fourth packets representing information each one of said fourth packets containing at least one of a plurality of portions of instruction representations corresponding to that of said one of said third packets and at least one of a plurality of data representations corresponding to that of said one of said third packets, said certain of said plurality of cell means thereby receiving fifth packets representing information, each one of said fifth packets containing at least one of a plurality of portions of instruction representations corresponding to that of said one of said fourth packets and at least one of a plurality of data representations corresponding to that of said one of said fourth packets.

e. the determination and transmission of said second packets being enabled in correspondence with the determination and transmission of said fourth packets.

16. A data processing apparatus for highly parallel execution of stored programs, said apparatus comprising:

a. memory means including a plurality of cell means, each of said cell means including a plurality of register means for holding first packets representing information, each one of said first packets containing at least one of a plurality of instruction representations designating an operation and at least one of a plurality of data representations designating an operand, each of said plurality of register means having a unique address;

b. arbitration means for determining and transmitting second packets representing information, each one of said second packets containing at least one of a plurality of portions of instruction representations corresponding to that of said one of said first packets and at least one of a plurality of data representations corresponding to that of said one of said first packets;

c. functional means including at least one operational means for producing and transmitting third packets representing information, each one of said third packets containing at least one of a plurality of portions of instruction representations corresponding to that of said one of said second packets and at least one of a plurality of data representations generated by operation of at least one of said operational means on at least one of a plurality of data representations corresponding to that of said one of said second packets; and d. distribution means for determining and transmitting fourth packets representing information each one of said fourth packets containing at least one of a plurality of portions of instruction repesentations corresponding to that of said one of said third packets and at least one of a plurality of data representations corresponding to that of said one of said third packets, certain of said plurality of cell means thereby receiving fifth packets representing information, each one of said fifth packets containing at least one of a plurality of portions of instruction representations corresponding to that of said one of said fourth packets and at least one of a plurality of data representations corresponding to that of said one of said fourth packets;

e. certain of said first packets, said second packets, said third packets, said fourth packets and said fifth packets containing at least one destination index by which is destination in the means to which it is directed is determined;

f. certain of said first packets containing at least one functional specification, said function specification designating the operational means to which it is directed through said arbitration means;

g. the determination and transmission of said second packets being enabled in correspondence with the determination and transmission of said fourth packets.

* * * * *